United States Patent
He et al.

(10) Patent No.: US 12,299,963 B2
(45) Date of Patent: May 13, 2025

(54) IMAGE PROCESSING METHOD AND APPARATUS, COMPUTER DEVICE, STORAGE MEDIUM, AND COMPUTER PROGRAM PRODUCT

(71) Applicant: TENCENT TECHNOLOGY (SHENZHEN) COMPANY LIMITED, Guangdong (CN)

(72) Inventors: Keke He, Guangdong (CN); Junwei Zhu, Guangdong (CN); Hui Ni, Guangdong (CN); Yun Cao, Guangdong (CN); Xu Chen, Guangdong (CN); Ying Tai, Guangdong (CN); Chengjie Wang, Guangdong (CN); Jilin Li, Guangdong (CN); Feiyue Huang, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 321 days.

(21) Appl. No.: 18/051,323

(22) Filed: Oct. 31, 2022

(65) Prior Publication Data
US 2023/0081982 A1   Mar. 16, 2023

Related U.S. Application Data

(63) Continuation of application No. PCT/CN2022/075952, filed on Feb. 11, 2022.

(30) Foreign Application Priority Data

Feb. 26, 2021   (CN) .......................... 202110216698.0

(51) Int. Cl.
*G06V 10/00* (2022.01)
*G06V 10/75* (2022.01)
(Continued)

(52) U.S. Cl.
CPC .......... *G06V 10/774* (2022.01); *G06V 10/751* (2022.01); *G06V 10/759* (2022.01);
(Continued)

(58) Field of Classification Search
CPC .. G06V 10/774; G06V 10/751; G06V 10/759; G06V 10/776; G06V 10/82;
(Continued)

(56) References Cited

U.S. PATENT DOCUMENTS

| 10,671,838 B1 | 6/2020 | Bogan, III et al. |
| 11,734,955 B2 * | 8/2023 | Liu ........................ G06F 18/214 382/118 |

(Continued)

FOREIGN PATENT DOCUMENTS

| CN | 106599817 A | 4/2017 |
| CN | 111210382 A | 5/2020 |

(Continued)

OTHER PUBLICATIONS

Zhang, Yan et al., "One Sample per Person Face Recognition Based on Deep Autoencoder", Pattern Recognition and Artificial Intelligence, Apr. 15, 2017, vol. 30, No. 04.

(Continued)

*Primary Examiner* — Md K Talukder
(74) *Attorney, Agent, or Firm* — Sughrue Mion, PLLC

(57) ABSTRACT

An image processing method includes performing additional image feature extraction on a training source face image to obtain a source additional image feature, performing identity feature extraction on the training source face image to obtain a source identity feature, inputting a training template face image into an encoder in a to-be-trained face swapping model to obtain a face attribute feature, inputting the source additional image feature, the source identity feature, and the face attribute feature into a decoder in the face swapping (Continued)

model for decoding to obtain a decoded face image, obtaining a target model loss value based on an additional image difference between the decoded face image and a comparative face image, and adjusting the model parameters of the encoder and the decoder based on the target model loss value to obtain the trained face swapping model.

20 Claims, 6 Drawing Sheets

(51) Int. Cl.
*G06V 10/774* (2022.01)
*G06V 10/776* (2022.01)
*G06V 10/82* (2022.01)
*G06V 40/16* (2022.01)

(52) U.S. Cl.
CPC ............ *G06V 10/776* (2022.01); *G06V 10/82* (2022.01); *G06V 40/168* (2022.01); *G06V 40/172* (2022.01)

(58) Field of Classification Search
CPC .. G06V 40/168; G06V 40/172; G06V 40/171; G06F 18/22; G06F 18/253; G06F 18/214; G06N 3/04; G06N 3/08
See application file for complete search history.

(56) References Cited

U.S. PATENT DOCUMENTS

| | | | |
|---|---|---|---|
| 11,748,928 B2* | 9/2023 | Yang | G06F 21/6245 382/233 |
| 2023/0115765 A1* | 4/2023 | Liang | G06V 40/171 345/626 |
| 2023/0316607 A1* | 10/2023 | He | G06V 40/161 382/308 |
| 2024/0161465 A1* | 5/2024 | He | G06V 10/764 |
| 2024/0303883 A1* | 9/2024 | Ozkan | G06V 10/82 |

FOREIGN PATENT DOCUMENTS

| | | |
|---|---|---|
| CN | 111401216 A | 7/2020 |
| CN | 111783603 A | 10/2020 |
| CN | 113705290 A | 11/2021 |

OTHER PUBLICATIONS

International Search Report for PCT/CN2022/075952 dated Apr. 20, 2022.
Zhejian University, "Design and Implementation of Arbitrary Face Exchange Algorithm Based on Generative Adversarial Networks", DOI: 10.27461/d.cnki.gzjdx.2020.001645, Feb. 15, 2021, 4 pages.
Communication issued Mar. 19, 2025 in Chinese application No. 202110216698.0.

* cited by examiner

IMAGE PROCESSING METHOD AND APPARATUS, COMPUTER DEVICE, STORAGE MEDIUM, AND COMPUTER PROGRAM PRODUCT

CROSS-REFERENCE TO RELATED APPLICATIONS

This application is a continuation application of International Application No. PCT/CN2022/075952, filed on Feb. 11, 2022, which claims priority to Chinese Patent Application No. 202110216698.0, filed with the China National Intellectual Property Administration on Feb. 26, 2021, the disclosures of each of which being incorporated by reference herein in their entireties.

FIELD

The disclosure relates to the field of image processing, and in particular, to an image processing method and apparatus, a computer device, a non-transitory computer-readable storage medium, and a program product.

BACKGROUND

With the development of computer technology and artificial intelligence technology, face swapping technology has emerged. The face swapping technology refers to swapping a face of a target object in an image with another face. The face swapping technology has many application scenarios, such as film and television character production, game character design, a virtual image, and privacy protection.

Currently, the face swapping technology may be implemented through an artificial intelligence-based neural network model. For example, an image may be inputted into a neural network model for face swapping, and the neural network model may output an image obtained by performing face swapping on the image.

However, there is a relatively large difference between an image obtained by conventional face swapping technology and an ideal image obtained after face swapping, resulting in poor face swapping effect.

SUMMARY

Various embodiments of the disclosure may provide an image processing method and apparatus, a computer device, a non-transitory computer-readable storage medium, and a program product.

An image processing method may be provided, performed by a computer device, the method including: obtaining a training source face image and a training template face image; performing additional image feature extraction on the training source face image to obtain a source additional image feature corresponding to the training source face image; performing identity feature extraction on the training source face image to obtain a source identity feature corresponding to the training source face image; inputting the training template face image into an encoder in a to-be-trained face swapping model for encoding to obtain a face attribute feature; inputting the source additional image feature, the source identity feature, and the face attribute feature into a decoder in the face swapping model for decoding to obtain a decoded face image; obtaining a comparative face image, the comparative face image including at least one of the training source face image and a standard face image corresponding to the decoded face image, and the standard face image and the training source face image being face images of a same object; and obtaining an additional image difference between the decoded face image and the comparative face image, and adjusting model parameters of the encoder and the decoder based on the additional image difference to obtain a trained face swapping model, so as to perform image processing according to the face swapping model.

An image processing method may be provided, performed by a computer device, the method including: obtaining a target source face image and a target template face image; performing additional image feature extraction on the target source face image to obtain a target source additional image feature corresponding to the target source face image; performing identity feature extraction on the target source face image to obtain a target identity feature corresponding to the target source face image; inputting the target template face image into an encoder in a trained face swapping model for encoding to obtain a target face attribute feature; and decoding the target source additional image feature, the target identity feature, and the target face attribute feature by a decoder in the face swapping model to obtain a face-swapped image, a face in the face-swapped image matching a face in the target source face image, and attributes in the face-swapped image matching attributes in the target template face image.

An image processing apparatus a computer device, a non-transitory readable storage medium, and a computer program product consistent with the foregoing methods may also be provided.

Details of one or more embodiments of the disclosure are provided in the subsequent accompanying drawings and descriptions. Other features, objectives, and advantages of the disclosure will become apparent from the specification, the accompanying drawings, and the claims.

BRIEF DESCRIPTION OF THE DRAWINGS

To describe the technical solutions of example embodiments of this disclosure more clearly, the following briefly introduces the accompanying drawings for describing the example embodiments. The accompanying drawings in the following description show only some embodiments of the disclosure, and a person of ordinary skill in the art may still derive other drawings from these accompanying drawings without creative efforts. In addition, one of ordinary skill would understand that aspects of example embodiments may be combined together or implemented alone.

DESCRIPTION OF EMBODIMENTS

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict.

Figure 1:
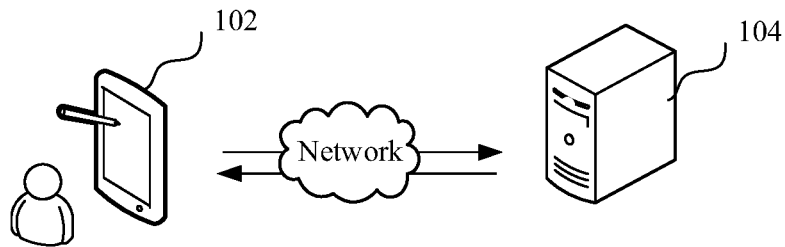
FIG. 1 is a diagram of an application environment of an image processing method according to some embodiments.

An image processing method provided in some embodiments may be applied to an application environment shown in FIG. 1. A terminal 102 communicates with a server 104 through a network. Specifically, the server 104 may obtain a training source face image and a training template face image, perform additional image feature extraction on the training source face image to obtain a source additional image feature corresponding to the training source face image, perform identity feature extraction on the training source face image to obtain a source identity feature corresponding to the training source face image, input the training template face image into an encoder in a to-be-trained face swapping model for encoding to obtain a face attribute feature, input the source additional image feature, the source identity feature, and the face attribute feature into a decoder in the face swapping model for decoding to obtain a decoded face image, and obtain an additional image difference between the decoded face image and a comparative face image, and obtain a target model loss value based on the additional image difference; the target model loss value being positively correlated to the additional image difference; and the comparative face image including at least one of the training source face image and a standard face image corresponding to the decoded face image, the standard face image and the training source face image being face images of a same object, and the model parameters of the encoder and decoder being adjusted based on the target model loss value to obtain a trained face swapping model to perform image processing according to the trained face swapping model.

For example, the server may obtain a target source face image and a target template face image, for example, may obtain a target source face image and a target template face image from the terminal 102. For example, the terminal 102 may transmit a face swapping request to the server, and the face swapping request may carry the target source face image and the target template face image. In response to the face swapping request, the server performs additional image feature extraction on the target source face image to obtain a target source additional image feature corresponding to the target source face image, performs identity feature extraction on the target source face image to obtain a target identity feature corresponding to the target source face image, inputs the target template face image into the encoder in the trained face swapping model for encoding to obtain a target face attribute feature, and decodes the target source additional image feature, the target identity feature, and the target face attribute feature to a decoder in the face swapping model to obtain a face-swapped image. A face in the face-swapped image matches a face in the target source face image, and attributes in the face-swapped image match attributes in the target template face image.

The terminal 102 may be, but not limited to, a personal computer, a notebook computer, a smartphone, a tablet computer, and a portable wearable device. The server 104 may be implemented by an independent server or a server cluster including a plurality of servers.

Figure 2:
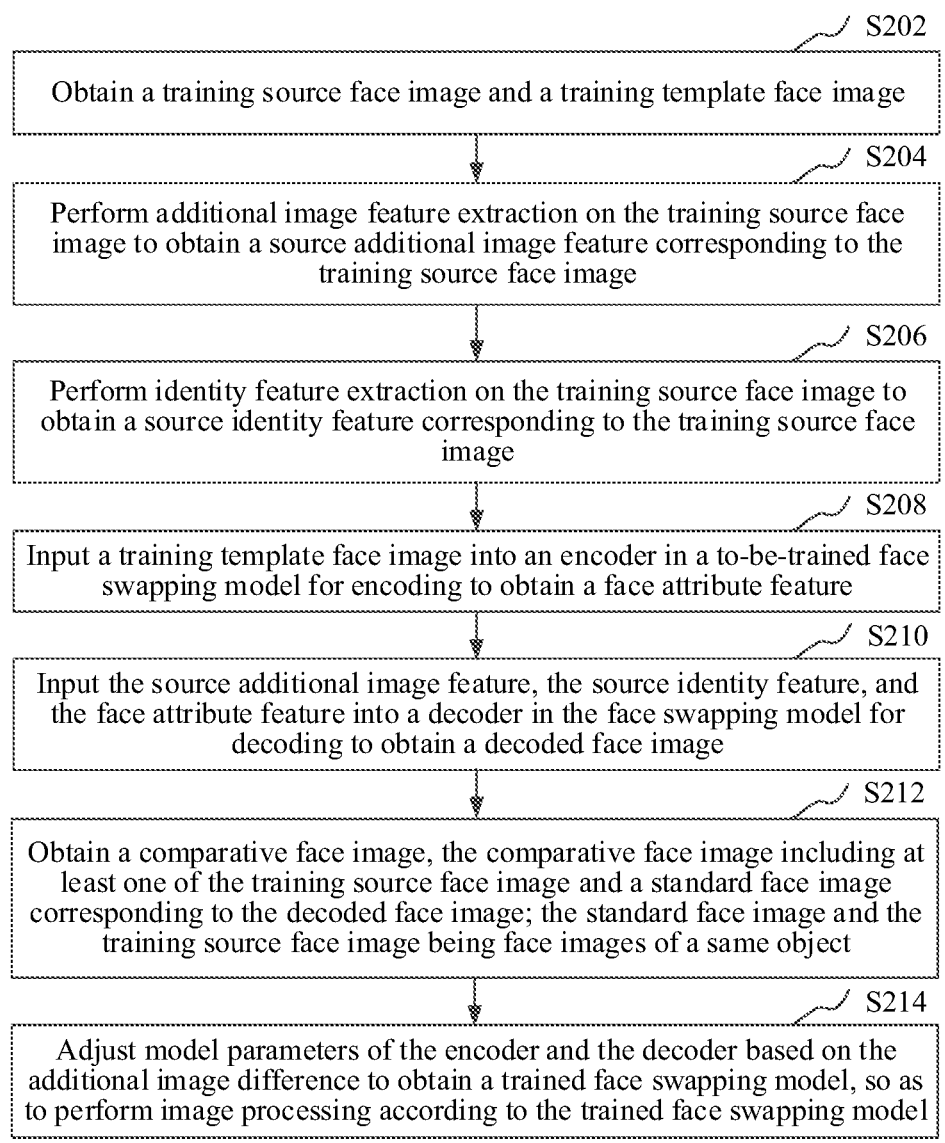
FIG. 2 is a schematic flowchart of an image processing method according to some embodiments.

In some embodiments, as shown in FIG. 2, an image processing method is provided, and a description is made by using an example in which the method is applied to the server 104 in FIG. 1, including the following operations:

S202. Obtain a training source face image and a training template face image.

A source face image is an image that provides a face, and a face of the face-swapped image is derived from the source face image. A template face image is an image that provides a face swapping template, and the face of the source image is transplanted into the template face image. That is, the face in the template face image is swapped by the face in the source face image, thereby forming a face-swapped image. The training source face image is the source face image used for training a model, and the training template face image is the template face image used for training the model. The training source face image and the training template face image are face images of different objects, and the objects may be people or animals. For example, the training source face image is a face image of an object A, and for example, the training template face image is a face image of an object B. When the object is a person, the training source face image and the training template face image may be face images of different people. The training source face image and the training template face image have different attribute information. The attribute information refers to information related to an image, which includes but is not limited to at least one of a face expression, a makeup, a posture, or a background. For example, the training source face image is a happy expression, and the training template face image is a sad expression. The training source face image is a real image, and the training template face image may be a real image or a synthetic image. For example, the real image may be an image collected directly. The training source face image and the training template face image may be video frames in a video. The training source face image is a face image wearing glasses. That is, the training source face image includes glasses, and the training template face image may or may not include glasses.

In some embodiments, when the to-be-trained face swapping model needs to be trained, the training source face image and the training template face image may be obtained. For example, the server may obtain a face image of a first object as the training source face image, and obtain a face image of a second object as the training template face image, where the face image of the second object may be a real image or a synthetic image. The face swapping model is a model used for performing face swapping. The to-be-trained face swapping model may be a completely untrained model, or a model that is trained and needs to be further optimized, and may be an artificial intelligence-based neural network model, such as a convolutional neural network model. When the object is a person, that is, when the face image is a face image, the face swapping model may also be referred to as a face swapping model, and is used for swapping the face in the image.

In some embodiments, the training template face image is synthesized based on a standard face image corresponding to the training source face image. The standard face image is an image expected to be generated from the training source face image and the model face image, and the standard face image is a real image. The standard face image and the training source face image are face images of the same object. The standard face image and the training source face image have different attribute information, such as different expressions. For example, a reference face image may be obtained, the reference face image and the training template face image are face images of the same object, and the reference face image and the training template face image have different attribute information, such as different postures. The face in the reference face image may be swapped with the standard face image to obtain the training template face image.

S204. Perform additional image feature extraction on the training source face image to obtain a source additional image feature corresponding to the training source face image.

The additional image feature refers to a feature of the additional image on the face. An image of the object includes an additional image and an original image. The original image is an original image of the object, that is, a real image. For example, when the object is a person, the original image is determined by the person's appearance, for example, may be embodied by at least one of a hairstyle, a skin color, a birthmark, or a mole.

The additional image does not belong to the original image of the object, and may be embodied by accessories attached to the face, such as glasses and earrings worn on the face. The accessories on the face may be referred to as additional objects, or appendixes. The appendixes have a relatively great impact on the overall image, for example, glasses have a relatively great impact on a person's overall image. When the additional objects include glasses and earrings, the additional image feature may include at least one of a glasses feature or an earring feature. Additional image feature extraction is performed on different images to obtain an additional image feature corresponding to the image. The source additional image feature corresponding to the training source face image is an additional image feature obtained by performing additional feature extraction on the training source face image.

Specifically, the source additional image feature may include a source glasses feature. For example, the server may perform glasses feature extraction on the training source face image to obtain a source glasses feature corresponding to the training source face image. For example, the server may use a trained additional image feature extraction network to perform additional image feature extraction on the training source face image to obtain a source additional image feature corresponding to the training source face image. The additional image feature extraction network is used for extracting additional image features, and there may be a plurality of additional image feature extraction networks, for example, may include a glasses feature extraction network used for extracting a glasses feature of glasses, an earring feature extraction network used for extracting earrings, or a pimple feature extraction network used for extracting pimples. The server may obtain a plurality of types of additional image feature extraction networks, respectively input the source face image into each additional image feature extraction network to obtain the additional feature outputted by each additional image feature extraction network, and form the source additional image feature corresponding to the source face image. For example, when the training source face image is a face image wearing glasses, the server may input the face image wearing glasses into the glasses feature extraction network to obtain a source glasses feature corresponding to the face image wearing glasses.

The trained additional image feature extraction network may be extracted from the trained additional image recognition model. For example, a feature extraction layer may be extracted before an image recognition layer from the trained additional image recognition model as the additional image feature extraction network. The additional image recognition model is used for recognizing additional objects, and the additional image recognition model may include more than one, for example, may include a glasses recognition model used for recognizing glasses. The glasses recognition model may recognize a type of glasses, and the additional image recognition model may be based on an artificial intelligence neural network, for example, may be based on a residual network 50 (resnet 50). A model based on the resnet 50 may perform a convolution operation on an input image, input the feature obtained by convolution into one or more residual blocks to perform further feature extraction, and perform image recognition based on the extracted feature. For example, a residual feature extraction network may be included in the additional image recognition model. The additional image recognition model may perform feature extraction on the training source face image by using the feature extraction network before the residual feature extraction network, use the extracted feature as the input feature of the residual feature extraction network to obtain the processed feature obtained by processing the input feature based on the residual feature extraction network, and fuse the processed feature with the input feature to obtain a final output feature of the residual feature extraction network. The additional image recognition model based on the resnet 50 network may improve the expression capability of features, improve the network convergence speed, and improve the accuracy of the model when the quantity of network layers is increased.

In some embodiments, when training the to-be-trained additional image feature extraction network, the server may further obtain a video clip that does not include the specific additional object as a negative sample, and use the negative sample and a positive sample to train the additional image feature extraction network. The positive sample refers to a video clip that includes the specific additional object to obtain the trained additional image feature extraction network. For example, the glasses feature extraction network is trained by using a video frequency band not including glasses and a video clip including glasses to obtain a trained glasses feature extraction network.

S206. Perform identity feature extraction on the training source face image to obtain a source identity feature corresponding to the training source face image.

The identity feature refers to a feature used for identifying the identity of the object, which may include at least one of a face feature or a face contour feature of the object. The face feature refers to a feature corresponding to the face feature, and the face contour feature refers to a feature corresponding to a contour of the face. The source identity feature corresponding to the training source face image refers to the identity feature obtained by performing identity feature extraction on the training source face image.

Specifically, the server may obtain the trained identity recognition model, input the training source face image into the trained identity recognition model, and obtain the source identity feature corresponding to the training source face image. The identity recognition model is used for identifying the identity of the object. When the training source face image is a face image, the identity recognition model may be a face recognition model, and the face recognition model is used for determining the identity of the person by recognizing the face.

S208. Input the training template face image into an encoder in a to-be-trained face swapping model for encoding to obtain a face attribute feature.

The face swapping model is used for swapping the face, that is, the face swapping model is used for swapping a face in one image (denoted as a first image) with a face in another image (denoted as a second image) to obtain a face-swapped image. By training the face swapping model, the face-swapped image may be maintained the same with an identity of the first image and with face attributes of the second image. Face attributes have nothing to do with the identity and may include at least one of a posture, an expression, skin tone, brightness, lighting, or texture. The face attribute feature refers to a feature corresponding to the face attribute. The face swapping model may include an encoder. The encoder is used for encoding the image to obtain the face attribute feature. The to-be-trained face swapping model may be an untrained model, or a model that is trained but needs to be further trained.

Specifically, the server may input the training template face image into an encoder in the to-be-trained face swapping model for encoding to obtain the face attribute feature corresponding to the training template face image.

S210. Input the source additional image feature, the source identity feature, and the face attribute feature into a decoder in the face swapping model for decoding to obtain a decoded face image.

The face swapping model may further include a decoder. The decoder is used for generating a decoded face image by using the source additional image feature, the source identity feature, and the face attribute feature. The decoded face image is an image obtained by the decoder based on the source additional image feature, the source identity feature, and the face attribute feature. The encoder and the decoder may be artificial intelligence-based neural networks, for example, may be based on a resnet network model, may be a model including several network layers in the resnet, and for example, may be a model including an eight-layer network in the resnet.

Specifically, the server may perform feature fusion of the source additional image feature, the source identity feature, and the face attribute feature to obtain a target fusion feature, for example, may form a feature triplet with the source additional image feature, the source identity feature, and the face attribute feature as the target fusion feature, and input the target fusion feature into the decoder in the face swapping model for decoding to obtain a decoded face image.

In some embodiments, the server may input the training template face image and the training source face image into the encoder in the face swapping model for encoding to obtain the face attribute feature corresponding to the training template face image and the source face feature corresponding to the training source face image, and perform feature fusion on the source face feature, the face attribute feature, the source additional image feature, and the source identity feature to obtain the target fusion feature. The source face feature may include at least one of a feature corresponding to an attribute of the training source face image or a feature corresponding to an identity.

In some embodiments, the encoder may include an attribute feature extraction model and a face feature extraction model, perform attribute feature extraction on the training template face image by using the attribute feature extraction model to obtain the face attribute feature corresponding to the training template face image, and perform face feature extraction on the training source face image to obtain the source face feature by using the face feature extraction model.

In some embodiments, the encoder and decoder may be neural networks in a generative network in a generative adversarial network (GAN). The generative adversarial network includes a generative network model (Generator) and a discriminant network model (Discriminator). The generative adversarial network learns by causing the generative network model and the discriminative network model to play against each other to obtain an expected machine learning model, which is an unsupervised learning method. An objective of the generative network model is to obtain the expected output according to the input, and distinguish the output of the network model from the real image as much as possible. The input of the discriminant network model includes the output of the generative network model and the real image. The two network models learn against each other and constantly adjust parameters. An ultimate objective is that the generative network model may deceive the discriminant network model as much as possible, so that the discriminant network model cannot determine whether an output result of the generative network model is true.

S212. Obtain a comparative face image, the comparative face image including at least one of the training source face image and a standard face image corresponding to the decoded face image, and the standard face image and the training source face image being face images of a same object.

The comparative face image may include at least one of the training source face image and a standard face image corresponding to the decoded face image. A standard face image corresponding to the decoded face image is consistent with the training source face image in identity and the additional object, and is consistent with the training template face image in attributes. The standard face image corresponding to the decoded face image is an image expected to be generated corresponding to the decoded face image, which may also be understood as a label. That is, it is hoped that the decoded face image is as consistent as possible with the standard face image. The decoded face image may be an image obtained by real shooting or a synthesized image.

The additional image difference is used for reflecting a difference between the decoded face image and the additional object included in the comparative face image, which may include a difference between the features, may also include a difference between the pixel values, and for example, may include a difference between the target additional image feature and the comparative additional image feature. The target additional image feature is an additional image feature obtained by performing additional image feature extraction on the decoded face image, and the comparative additional image feature is an additional image feature obtained by performing additional image feature extraction on the comparative face image. The additional image difference may further include a difference in the pixel values between the additional image region and the image matching region. The additional image region refers to a region in which the additional object is located in the comparative face image. The image matching region refers to a region in the decoded face image that matches a position of the additional image region, for example, a region whose position is the same as the additional image region. The comparative additional image feature may include at least one of the source additional image feature or the standard additional image feature. The standard additional image feature is an additional image feature obtained by performing additional image feature extraction on the standard face image. The additional image difference may include the difference between the target additional image feature and the source additional image feature, and may further include the difference between the target additional image feature and the standard additional image feature.

Specifically, the server may input the decoded face image into the trained additional image feature extraction network to obtain the target additional image feature corresponding to the decoded face image, and may input the comparative face image into the trained additional image feature extraction network to obtain the comparative additional image feature corresponding to the comparative face image.

In some embodiments, the comparative face image is a standard face image. The server may obtain a non-additional image region from the standard face image, obtain a region matching a position of the non-additional image region from the decoded face image, obtain the matching non-additional region, obtain the non-additional image difference between the non-additional image region and the matching non-additional region, and obtain a target model loss value based on the additional image difference and the non-additional image difference. For a process of obtaining the non-additional image difference, reference may be made to the related content of obtaining the additional image difference. The non-additional image region refers to a region other than the additional image region in the standard face image.

A target model loss value is calculated and obtained according to the additional image difference, which is positively correlated to the additional image difference. For example, the target model loss value may be the additional image difference, or may also be obtained by performing a linear operation or a nonlinear operation on the additional image difference. The linear operation may include at least one of an addition operation, a subtraction operation, a multiplication operation, or a division operation. The nonlinear operation may include at least one of a logarithmic operation, a square root operation, an exponential operation, or a trigonometric function operation. A loss value is obtained according to a loss, and a loss function is a function used for representing a "risk" or a "loss" of an event. A positive correlation refers to that when other conditions remain unchanged, two variables change in the same direction. When one variable changes from large to small, the other variable also changes from large to small. It is to be understood that the positive correlation refers to that a direction of change is consistent, but it does not require that when one variable changes a little, the other variable also needs to change. For example, when a variable a is 10 to 20, a variable b may be set to 100, and when the variable a is 20 to 30, the variable b may be set to 120. In this way, directions of change of both a and b are that when a becomes larger, b also becomes larger. However, when a is in a range of 10 to 20, b may be unchanged.

In some embodiments, the target model loss value may further include an identity loss value. The server may extract a target identity feature corresponding to the decoded face image, and calculate a difference between the target identity feature and the comparative identity feature to obtain an identity loss value. A difference between the target identity feature and the comparative identity feature is positively correlated to the identity loss value. The target identity feature is the identity feature obtained by performing identity feature extraction on the decoded face image. The comparative identity feature is the identity feature obtained by performing identity feature extraction on the comparative face image. The comparative identity feature may include at least one of the source identity feature or the standard identity feature. The standard identity feature is an identity feature obtained by performing identity feature extraction on the standard face image.

In some embodiments, the server may calculate a similarity between the target identity feature and the comparative identity feature to obtain an identity feature similarity. The identity loss value is obtained based on the identity feature similarity, the difference between the target identity feature and the comparative identity feature is negatively correlated to the identity feature similarity, and the identity loss value is negatively correlated to the identity feature similarity. For example, when the comparative identity feature is the source identity feature, the server may calculate the identity loss value id_loss by using the formula (1), where id_loss represents the identity loss value, result_id_feature represents the target identity feature, and src_id_feature represents the source identity feature.

cosine_similarity (result_id_feature, src_id_feature) represents a cosine similarity between result_id_feature and src_id_feature, that is, the identity feature similarity.

$$id\_loss = 1 - \text{cosine\_similarity}(result\_id\_feature, src\_id\_feature) \qquad (1)$$

For example, a calculation formula of the cosine similarity may be expressed as the formula (2), where A and B are respectively a vector, and $A_i$ and $B_i$ respectively represent components of the vector A and the vector B. similarity and $\cos(\theta)$ represent the cosine similarity. $\beta$ represents an angle between the vector A and the vector B.

$$\text{similarity} = \cos(\theta) = \frac{A \cdot B}{\|A\|\|B\|} = \frac{\sum_{i=1}^{n} A_i \times B_i}{\sqrt{\sum_{i=1}^{n}(A_i)^2} \times \sqrt{\sum_{i=1}^{n}(B_i)^2}} \qquad (2)$$

A negative correlation refers to that when other conditions remain unchanged, two variables change in opposite directions. When one variable changes from large to small, the other variable also changes from small to large. It is to be understood that the negative correlation refers to that a direction of change is opposite, but it does not require that when one variable changes a little, the other variable also needs to change.

S214. Adjust model parameters of the encoder and the decoder based on the additional image difference to obtain a trained face swapping model, so as to perform image processing according to the trained face swapping model.

Model parameters refer to variable parameters inside the model. A neural network model may also be referred to as a neural network weight.

Specifically, the server may adjust model parameters of the encoder and the decoder based on the target model loss value, so as to jointly train the encoder and the decoder to obtain the trained encoder and the trained decoder, and obtain a trained face update model based on the trained encoder and the trained decoder. A trained face update model includes the trained encoder and the trained decoder.

In some embodiments, a gradient descent method, such as an Adam-based gradient descent method, may be used for adjusting the model parameters in the face update model in a direction of decreasing the target model loss value, so as to obtain the trained face update model. After the trained face update model is obtained, the image may be processed by using the trained face update model. The face feature and contour in a first face image may be swapped with a second face image, so as to implement face swapping on the second face image.

In some embodiments, the image processing method may be applied to video face swapping. A face of a first character in a video is swapped into a face of a second character, so as to implement the face swapping of a character in the video, that is, to implement the video face swapping.

The video face swapping refers to swapping a face in one face image (denoted as an original face image) to another face image (denoted as a face image before swapping) to obtain the swapped face image, and causing the face image after swapping to be consistent with the face image before swapping in expression, angle, and background, and the identity corresponding to the face image after swapping is consistent with the original face image. As shown in FIG. A, the original face image is a face image a, the face image before swapping is a face image b, and the face image after swapping is a face image c. It may be clearly seen that the face image c and the face image b are consistent in expression, angle, and background, and the face image c and the face image a are consistent in identity, that is, the face image c and the face image a are faces of the same character.

The video face swapping may be applied in a plurality of scenarios, such as film and television portrait production, game character design, a virtual image, and privacy protection. In the film and television production, some professional actions are usually done by professionals. After the camera shoots a video of a professional, the face swapping technology may be used to swap the face of the professional in the video with a face of a real actor, or swap a face of an actor who commits bad behaviors in the video, thereby saving the cost of the film and television production. In game production, the generation and transformation of game art images and the production of art resources require a lot of cost. The face swapping technology may be used for generating characters with a specific style, thereby helping save the cost of art. In a livestream, the user may swap the face with a face of the virtual character, thereby protecting the privacy of the user and improving the fun of the livestream.

It is to be understood that the training of a model may be iterative a plurality of times, that is, the trained face swapping model may be iteratively trained. When a model convergence condition is satisfied, the training is stopped. The model convergence condition may include that a change of a model loss value is less than a change of a preset loss value, or that a change of a model parameter is less than the preset parameter change value. For example, when training samples formed by the source face image and the template face image are more than one, the training may be performed a plurality of times. One or more training samples are used for model training each time, and more than one refers to at least two.

In the image processing method, a training source face image and a training template face image are obtained, additional image feature extraction is performed on the training source face image to obtain a source additional image feature corresponding to the training source face image, identity feature extraction is performed on the training source face image to obtain a source identity feature corresponding to the training source face image, the training template face image is inputted into an encoder in a to-be-trained face swapping model for encoding to obtain a face attribute feature, the source additional image feature, the source identity feature, and the face attribute feature are inputted into a decoder in the face swapping model for decoding to obtain a decoded face image, an additional image difference between the decoded face image and a comparative face image is obtained, and a target model loss value is obtained based on the additional image difference. The target model loss value is positively correlated to the additional image difference, the comparative face image includes at least one of a training source face image and a standard face image corresponding to the decoded face image, and the model parameters of the encoder and decoder are adjusted based on the target model loss value to obtain the trained face swapping model for performing image processing according to the trained face swapping model. Because the decoded face image is decoded and obtained by inputting the source additional image feature, the source identity feature, and the face attribute feature into the decoder in the face swapping model.

In addition, the target model loss value is obtained according to the additional image difference between the decoded face image and the comparative face image, and the target model loss value is positively correlated to the additional image difference. Therefore, the face swapping model obtained by training may improve the consistency of the identity of the face-swapped image and the identity of the source face image, improve the consistency of attributes of the face-swapped image and the template face image, and may improve the consistency of the additional image of the face-swapped image and the additional image of the source face image. When the face swapping model is used for performing image processing, the face swapping effect may be improved, that is, the face swapping effect may be improved.

In some embodiments, the additional image difference includes a first image feature difference, and the obtaining an additional image difference between the decoded face image and the comparative face image, and adjusting model parameters of the encoder and the decoder based on the additional image difference to obtain a trained face swapping model includes: performing additional image feature extraction on the decoded face image to obtain a target additional image feature corresponding to the decoded face image; determining an image feature difference between the source additional image feature and the target additional image feature as a first image feature difference; and adjusting the model parameters of the encoder and the decoder based on the first image feature difference to obtain the trained face swapping model.

The image feature difference refers to a difference between image features, and a first image feature difference refers to a difference between the source additional image feature and the target additional image feature. The target model loss value is positively correlated to the first image feature difference.

Specifically, the server may input the decoded face image into the trained additional image feature extraction network to obtain the target additional image feature corresponding to the decoded face image, calculate a similarity between the source additional image feature and the target additional image feature to obtain an additional feature similarity, and obtain a first image feature difference based on the additional feature similarity. The additional feature similarity is negatively correlated to the first image feature difference. For example, an inverse or reciprocal of the additional feature similarity may be used as the first image feature difference. The additional feature similarity may be the cosine similarity.

In some embodiments, the server may obtain the additional feature loss value according to the first image feature difference, where the additional feature loss value is positively correlated to the first image feature difference, and is negatively correlated to the additional feature similarity, may use the first image feature difference as an additional feature loss value, and may also perform linear calculation or nonlinear calculation on the first image feature difference to obtain the additional feature loss value. The target model loss value is obtained based on the additional feature loss value, and the target model loss value is positively correlated to the additional feature loss value.

In some embodiments, the server may use a result of subtracting a preset value and the additional feature similarity as a first image feature difference, and use the first image feature difference as the additional feature loss value. For example, the preset value may be 1. When the additional image feature is a glasses feature, the source additional image feature may further be referred to as the source glasses feature, the target additional image feature may further be referred to as the target glasses feature, the additional feature similarity may further be referred to as the glasses similarity, and the additional feature loss value may further be referred to as the glasses loss value. For example, the glasses loss value may be calculated by using the formula (3). glass_loss represents the glasses loss value, result_glass_feature represents the target glasses feature, and src_glass_feature represents the source glasses feature. cosine_similarity (result_glass_feature, src_glass_feature) represents a cosine similarity between result_glass_feature and src_glass_feature, that is, the additional feature similarity.

$$\text{glass\_loss}=1-\text{cosine\_similarity}(\text{result\_glass\_feature}, \text{src\_glass\_feature}) \qquad (3)$$

In this embodiment, the image feature difference between the source additional image feature and the target additional image feature is determined as the first image feature difference, and the model parameters of the encoder and the decoder are adjusted based on the first image feature difference to obtain the trained face swapping model. Because the smaller the first image feature difference, the smaller the difference between the source additional image feature and the target additional image feature is, when the model parameters are adjusted in a direction of decreasing the first image feature difference, the difference between the source additional image feature and the target additional image feature decreases, thereby improving the image similarity between the decoded face image and the training source face image, and improving the face swapping effect.

In some embodiments, the adjusting the model parameters of the encoder and the decoder based on the first image feature difference to obtain the trained face swapping model includes: obtaining the target model loss value based on the first image feature difference; the target model loss value being positively correlated to the first image feature difference; and adjusting the model parameters of the encoder and the decoder based on the target model loss value to obtain the trained face swapping model.

The image feature difference refers to a difference between image features, and a first image feature difference refers to a difference between the source additional image feature and the target additional image feature. The target model loss value is positively correlated to the first image feature difference.

Specifically, the server may perform linear transformation or nonlinear transformation on the first image feature difference to obtain the target model loss value, and the linear transformation includes, but is not limited to, at least one of operations such as an addition operation and a multiplication operation. The nonlinear transformation includes, but is not limited to, at least one of an exponential operation, a logarithmic operation, or the like.

In this embodiment, because the target model loss value is positively correlated to the first image feature difference, when the model parameters are adjusted in the direction of decreasing the target model loss value, the first image feature difference is reduced. In this way, the difference between the source additional image feature and the target additional image feature is decreased, thereby improving the similarity in images between the decoded face image and the training source face image, and improving the face swapping effect.

In some embodiments, the obtaining an additional image difference between the decoded face image and the comparative face image, and adjusting model parameters of the encoder and the decoder based on the additional image difference to obtain a trained face swapping model includes: performing recognition on an additional image of the comparative face image to obtain an additional image region corresponding to the comparative face image; obtaining an additional image enhancement value corresponding to the additional image region; determining an image difference between the additional image region and an image region at a corresponding position in the decoded face image as the additional image difference; obtaining an additional image loss value based on the additional image difference, and performing enhancement processing on the additional image loss value by using the additional image enhancement value to obtain a target model loss value; and adjusting the model parameters of the encoder and the decoder based on the target model loss value to obtain the trained face swapping model.

The additional image region refers to a region in which the additional object is located. Performing recognition on an additional image of the comparative face image refers to determining a region of the additional object in the comparative face image. The additional image difference may include an image difference between the additional image region and an image region at a corresponding position in the decoded face image, and the image region at the corresponding position in the decoded face image refers to the image matching region.

The additional image loss value is obtained according to the additional image difference, and the additional image loss value is positively correlated to the additional image difference. For example, the additional image difference may be used as the additional image loss value, or the additional image loss value may be obtained by performing a linear operation or a nonlinear operation on the additional image difference. The additional image enhancement value may be a preset value, such as 6, used for performing enhancement processing on the additional image loss value. Performing enhancement processing on the additional image loss value by using the additional image enhancement value may include performing a sum operation or a multiplication operation by using at least one of the additional image enhancement value and the additional image loss value.

Specifically, the server may perform recognition on the additional object in the comparative face image, determine a region in which the additional object is located from the comparative face image to obtain the additional image region, for example, may obtain a trained additional region recognition model. The additional region recognition model may recognize a region in which the additional object is located from the image. Certainly, the additional region recognition model may further recognize other regions of the face from the image, such as a region in which the mouth is located. When the comparative face image is a face image, the additional region recognition model may be a face segmentation model. The face segmentation model is used for segmenting a face to obtain a region in the face, for example, obtain a glasses region in the face, that is, a region in which the glasses are located. The server may determine region position information of the additional image region from the comparative face image, determine a region corresponding to the region position information from the decoded face image to obtain an image matching region, and calculate a difference between the additional image region and the image matching region to obtain the additional image difference.

In some embodiments, the image difference may include a difference in pixels and a difference in features, for example, may calculate a calculation value of a difference between the pixel values of the additional image region and a corresponding position of the image matching region to obtain a difference calculation value, where the difference calculation value reflects a difference in time pixels. The server may further perform feature extraction on the additional image region to obtain the extracted additional image feature, and perform feature extraction on the image matching region to obtain the decoded image feature, calculate a difference between the extracted additional image feature and the decoded image feature to obtain a second image feature difference, where the second image feature difference reflects a difference in features. The additional image difference may further include at least one of a second image feature difference or a difference calculation value.

In some embodiments, the server may obtain an additional feature-level loss value based on the second image feature difference to obtain an additional pixel-level loss value based on the difference calculation value. The additional feature-level loss value is positively correlated to the second image feature difference, the additional pixel-level loss value is positively correlated to the difference calculation value, and the additional image loss value includes at least one of an additional pixel-level loss value or an additional feature-level loss value.

In some embodiments, the comparative face image is a standard face image. The server may perform enhancement processing on the additional image loss value by using the additional image enhancement value to obtain the enhanced additional image loss value, obtain the non-additional image loss value based on the non-additional image difference to obtain the non-additional image enhancement value corresponding to the non-additional image region, perform enhancement processing on the non-additional image loss value by using the non-additional image enhancement value to obtain the enhanced non-additional image loss value, and obtain the target model loss value by performing weighted calculation according to the enhanced additional image loss value and the enhanced non-additional image loss value. The non-additional image loss value is positively correlated to the non-additional image difference. The enhanced additional image loss value is positively correlated to the target model loss value.

In some embodiments, the server may perform mask processing on the image to obtain a mask of the additional image region, such as a mask corresponding to the glasses region, so as to obtain the additional image region by segmenting the image. The mask of the additional image region may include a mask value corresponding to a pixel in the additional image region (denoted as a first mask value), and may further include a mask value corresponding to a pixel in the non-additional image region (denoted as a second mask value). The first mask value is greater than the second mask value. The first mask value and the second mask value may be set as required. The first mask value is, for example, 1, and the second mask value is, for example, 0. The non-additional image region refers to a region of an image other than the additional image region. For example, when a standard face image is a face image including glasses, mask processing may be performed on the standard face image to obtain a mask of the glasses region. The mask of the glasses region may be expressed as glass_mask=segmentation(gt_img) (4), where glass_mask represents the mask of the glasses region, gt_img represents a standard face image, segmentation(•) represents that mask processing is performed on the image to obtain the mask of the glasses region. glass_mask may include a mask value corresponding to a pixel of the glasses region and a mask value corresponding to a pixel of a non-glasses region.

In some embodiments, the comparative face image is a standard face image. The server may perform calculation based on the mask of the additional image region to obtain an additional image enhancement value and a non-additional image enhancement value. For example, a first mask value corresponding to the additional image region may be determined from the mask of the additional region, and the additional image enhancement value may be obtained according to the first mask value, and the additional image enhancement value is positively correlated to the first mask value. Similarly, a non-additional image enhancement value may be obtained, and the non-additional image enhancement value is positively correlated to the second mask value corresponding to the non-additional image region. When the additional image region is the glasses region, the additional image enhancement value may be referred to as a glasses enhancement value, and the non-additional image enhancement value may be referred to as a non-glasses enhancement value.

$$\text{mask\_weight} = (1 + \text{glass\_weight} * \text{glass\_mask}) \tag{5}$$

For example, the glasses enhancement value and the non-glasses enhancement value may be calculated by using the formula (5), where glass_weight is a preset value, and may be set as required, for example may be 5. mask_weight includes a glasses enhancement value and a non-glasses enhancement value, a glasses enhancement value in mask_weight is calculated and obtained according to the mask value corresponding to the glasses region in glass_mask, and a non-glasses enhancement value in mask_weight is calculated and obtained from the mask value corresponding to the non-glasses region in glass_mask. For example, when a mask value corresponding to the glasses region is 1, a mask value corresponding to the non-glasses region is 0, and glass_weight is 5, the glasses enhancement value is 6, and the glasses enhancement value is 1.

For example, the enhanced non-additional image loss value and the enhanced additional image loss value may be calculated by using the formula (6), where result represents the decoded face image, gt_img represents the standard face image, |result−gt_img| represents a pixel difference between the decoded face image and the standard face image, and includes the non-additional image loss value and the additional image loss value. Reconstruction_loss includes the enhancement non-additional image loss value and the enhanced additional image loss value. The enhancement non-additional image loss value in Reconstruction_loss is a product of the non-additional image enhancement value (that is, the non-glasses enhancement value) in mask_weight and the non-additional image loss value in |result−gt_img|. The enhanced additional image loss value in Reconstruction_loss is a product of the additional image enhancement value in mask_weight (that is, the glasses enhancement value) and the additional image loss value in |result−gt_img|. Reconstruction_loss may be referred to as a reconstruction loss function Reconstruction_loss=mask_weight*|result−*gt_img*|     (6).

In this embodiment, enhancement processing is performed on the additional image loss value by using the additional image enhancement value to obtain the target model loss value, which may implement the amplification of the additional image loss value. Because the enhanced additional image loss value is positively correlated to the target model loss value, when the model parameters are adjusted in the direction of decreasing the target model loss value, the enhanced additional image loss value decreases, which is beneficial to the enhancement of the additional image region. For example, the enhancement of the glasses region may better obtain the effect of maintaining the glasses, that is, to improve the similarity between the additional object in the decoded face image and the additional object in the training source face image.

In some embodiments, the determining an image difference between the additional image region and an image region at a corresponding position in the decoded face image as the additional image difference includes: obtaining additional pixels in the additional image region, and obtaining decoded pixels that match positions of the additional pixels from the decoded face image; calculating difference values of pixel values between the additional pixels and the decoded pixels; and calculating difference values of pixel values corresponding to the additional image region to obtain a difference calculation value, and using the difference calculation value as the additional image difference.

The additional pixel is a pixel in the additional image region. The decoded pixel is a pixel in the decoded face image that matches a position of the additional pixel. The difference value of the pixel value refers to a difference in the pixel value between the additional pixel and the decoded pixel. The difference calculation value is a calculation value corresponding to a difference value of each pixel value, such as a sum result or a mean average value.

Specifically, the server may obtain the additional pixel value corresponding to the additional pixel, obtain the decoded pixel value corresponding to the decoded pixel matching a position of the additional pixel from the decoded face image, calculate a difference between the additional pixel value and the decoded pixel value to obtain the difference value of the pixel value, perform calculation operation on a difference value of each pixel value, such as performing a sum operation or an average operation to obtain a difference calculation value, and obtain the additional image difference based on the difference calculation value. For example, the difference calculation value may be used as the additional image difference, or the difference calculation value and the first image feature difference may be used as the additional image difference.

In this embodiment, calculation is performed on the difference value of the pixel value corresponding to the additional image region to obtain the difference calculation value, which may determine the difference in pixel value between the additional image region in the decoded face image and the corresponding region in the comparative face image. The difference in images may be accurately reflected by using the difference calculation value as the additional image difference and the accuracy of the additional image difference is improved.

In some embodiments, the determining an image difference between the additional image region and an image region at a corresponding position in the decoded face image as the additional image difference includes: performing feature extraction on an additional image region to obtain an extracted additional image feature; performing feature extraction on an image region corresponding to the additional image region in the decoded face image to obtain a decoded image feature; calculating an image feature difference between the extracted additional image feature and the decoded image feature as a second image feature difference; and obtaining the additional image difference based on the second image feature difference.

Extracting the additional image feature is a feature that is used for performing feature extraction on the additional image region. The decoded image feature is a feature obtained by performing feature extraction on an image region corresponding to the additional image region in the decoded face image. The additional image region in the decoded face image is entered into the corresponding image region, which refers to a region in the decoded face image that matches a position of the additional image region. The second image feature difference refers to a difference between extracting the additional image feature and the decoded image feature. The additional image difference may further include a second image feature difference.

Specifically, the operation of performing feature extraction on the additional image region to obtain the additional image feature may include: performing additional image feature extraction on the comparative face image to obtain the comparative additional image feature corresponding to the comparative face image, and using the comparative additional image feature as the extracted additional image feature, where the extracted additional image feature may include at least one of the source additional image feature or the standard additional image feature. The operation of performing feature extraction on an image region corresponding to the additional image region in the decoded face image to obtain a decoded image feature may include: performing additional image feature extraction on the decoded face image to obtain the decoded additional image feature corresponding to the decoded face image as the decoded image feature.

In some embodiments, the extracted additional image feature more be more than one, and the decoded image feature may also be more than one. For example, the server may input the decoded face image or the image matching region into a preset neural network model, and perform feature extraction on the image matching region by using one or more feature extraction layers of the preset neural network model to obtain the decoded image feature outputted by each feature extraction layer. Similarly, the server may input a standard face image or an additional image region into the preset neural network model, and perform feature extraction on the additional image region by using one or more feature extraction layers of the preset neural network model to obtain the extracted additional image feature outputted by each feature extraction layer. The server may calculate a difference between the decoded image feature outputted by the same feature extraction layer and the extracted additional image feature, and use the calculation value of each difference as the second image feature difference. The preset neural network model may be any trained model, and may be a model based on a convolutional neural network, such as a pre-trained alexnet network model.

In this embodiment, the image feature difference between the extracted additional image feature and the decoded image feature is calculated as the second image feature difference. The additional image difference is obtained based on the second image feature difference, so that the additional image difference may accurately reflect the difference in features between the decoded face image and the additional object in the comparative face image, and the accuracy of the additional image difference is improved.

In some embodiments, the obtaining an additional image loss value based on the additional image difference, and performing enhancement processing on the additional image loss value by using the additional image enhancement value to obtain a target model loss value includes: obtaining the additional image loss value based on the additional image difference, and performing enhancement processing on the additional image loss value by using the additional image enhancement value to obtain the enhanced additional image loss value; obtaining a non-additional image region corresponding to the comparative face image, and determining an image difference between the non-additional image region and an image region at a corresponding position in the decoded face image as a non-additional image difference; obtaining a non-additional image loss value based on the non-additional image difference, where a non-additional image enhancement value corresponding to the non-additional image loss value is less than the additional image enhancement value; and obtaining a target model loss value according to the enhanced additional image loss value and the non-additional image loss value.

The enhanced additional image loss value is obtained by performing enhancement processing on the additional image loss value by using the additional image enhancement value. The non-additional image region refers to a region other than the additional image region in the comparative face image. The non-additional image difference refers to an image difference between the non-additional image region and the image region at the corresponding position in the decoded face image. For a process of obtaining the non-additional image difference, reference may be made to the related operations of obtaining the additional image difference. The non-additional image loss value is positively correlated to the non-additional image difference. The non-additional image loss value may correspond to a non-additional image enhancement value, and the non-additional image enhancement value is used for performing enhancement processing on the non-additional image loss value. The non-additional image enhancement value may be preset.

Specifically, the server may perform enhancement processing on the non-additional image loss value by using the non-additional image enhancement value to obtain the enhanced non-additional image loss value, and obtain the target model loss value by performing a weighted calculation based on the enhanced additional image loss value and the enhanced non-additional image loss value.

In some embodiments, the server may input the decoded face image into the preset neural network model, and perform feature extraction on the decoded face image by using one or more feature extraction layers in the preset neural network model to obtain each decoded face feature. Because the decoded face image includes the image matching region, the decoded face feature includes the decoded image feature obtained by performing feature extraction on the image matching region, and further includes a non-matching image feature. The non-matching image feature is a feature obtained by performing feature extraction on the region other than the image matching region. Similarly, the server may input the standard face image into the preset neural network model to obtain various standard face features. Because the standard face image includes the additional image region, the standard face feature includes the extracted additional image feature obtained by performing feature extraction on the additional image region. Because the standard face image further includes the non-additional image region, the standard face feature further includes the extracted non-additional image feature obtained by performing feature extraction on the non-additional image region. The server may calculate the difference between the non-additional image feature and the non-matching image feature obtained by the same feature extraction layer, perform calculation operation based on each difference to obtain the non-image feature difference, and obtain the non-additional image feature based on the non-image feature difference, where the non-additional image difference may include the non-image feature difference.

For example, each decoded face feature may be obtained according to the formula (7), and each standard face feature may be obtained according to the formula (8), where alexnet_feature (result) represents that the decoded face image result is inputted into an alexnet network model and a feature of result outputted by four feature extraction layers of the alexnet network model is outputted. result_fea1, result_fea2, result_fea3, and result_fea4 are respectively decoded face features of the decoded face image outputted by each of the four feature extraction layers. alexnet_feature (gt_img) represents that the standard face image gt_img is inputted into an alexnet network model and a feature of gt_img outputted by four feature extraction layers of the alexnet network model is outputted. gt_img_fea1, gt_img_fea2, gt_img_fea3, and gt_img_fea4 are respectively standard face features of the standard face image gt_img outputted by each of the four feature extraction layers.

$$\text{result\_}fea1, \text{result\_}fea2, \text{result\_}fea3,$$
$$\text{result\_}fea4 = \text{alexnet\_feature}(result) \qquad (7).$$

$$gt\_img\_fea1, gt\_img\_fea2, gt\_img\_fea3,$$
$$gt\_img\_fea4 = \text{alexnet feature}(gt\_img) \qquad (8),$$

In some embodiments, the server may calculate the difference between the decoded face feature and the standard face feature to obtain the face feature difference, and determine the face difference loss value based on the face feature difference. The face feature difference includes the second image feature difference and the non-image feature difference, and the face difference loss value includes a loss value determined based on the second image feature difference and a loss value determined based on the non-image feature difference. The enhanced non-additional image loss value and the enhanced additional image loss value may be obtained by performing enhancement processing on the face feature difference. For example, the enhanced non-additional image loss value and the enhanced additional image loss value may be calculated by using the formula (9). |result_fea1_gt_img_fea1|, |result_fea2_gt_img_fea2|, |result_fea3_gt_img_fea3, and |result_fea4−gt_img_fea4| represent the extracted feature difference, LPIPS_loss includes the enhanced non-additional image loss value and the enhanced additional image loss value, and LPIPS_loss may be referred to as a learned perceptual image patch similarity (LPIPS) loss function. LPIPS loss, also referred to as perceptual loss, is used for evaluating a difference between two images. The larger the LPIPS loss, the larger the difference between the two images, the smaller the LPIPS loss, the smaller the difference between the two images. The LPIPS loss function is a loss function at a feature level, which may compare the dissimilarity of two images.

$$\text{LPIPS\_loss} = \text{mask\_weight} * (|\text{result\_}fea1 - gt\_img\_fea1| + |\text{result\_}fea2 - gt\_img\_fea2| + |\text{result\_}fea3 - gt\_img\_fea3| + |\text{result\_}fea4 - gt\_img\_fea4|) \quad (9)$$

In this embodiment, a target model loss value is obtained according to the enhanced additional image loss value and the non-additional image loss value, so that the target model loss value may include a loss value obtained by the additional image region and a loss value obtained by the non-additional image region, and not only the effect of a region in which the additional object after face swapping is located is improved, but also the effect of the region other than the additional object is improved, thereby improving the face swapping effect.

In some embodiments, the adjusting the model parameters of the encoder and the decoder based on the additional image difference to obtain the trained face swapping model includes: obtaining the additional image loss value based on the additional image difference; performing identity feature extraction on the decoded face image to obtain a target identity feature corresponding to the decoded face image; obtaining an identity loss value based on an identity feature difference between the source identity feature and the target identity feature; obtaining a target model loss value according to the additional image loss value and the identity loss value; and adjusting the model parameters of the encoder and the decoder based on the target model loss value to obtain the trained face swapping model.

Specifically, the target identity feature is the identity feature obtained by performing identity feature extraction on the decoded face image. The identity feature difference refers to the difference between the source identity feature and the target identity feature, and the identity loss value is positively correlated to the identity feature difference.

In this embodiment, the identity loss value is obtained based on the identity feature difference between the source identity feature and the target identity feature, and the target model loss value is obtained according to the additional image loss value and the identity loss value, which may cause the identity of the decoded face image to be consistent with the identity of the training source face image, and cause the additional image of the decoded face image to be consistent with the additional image of the training source face image, thereby improving the face swapping effect.

In some embodiments, the performing additional image feature extraction on the training source face image to obtain the source additional image feature corresponding to the training source face image includes: inputting the training source face image into the trained additional image feature extraction network to perform additional image feature extraction to obtain a source additional image feature corresponding to the training source face image; and the adjusting the model parameters of the encoder and decoder based on the target model loss value to obtain the trained face swapping model includes: maintaining network parameters of the additional image feature extraction network unchanged, and adjusting the model parameters of the encoder and the decoder based on the target model loss value to obtain the trained face swapping model.

The additional image feature extraction network is used for extracting the additional image feature, which may be a feature extraction layer in the additional image feature extraction network. A network parameter value refers to a variable parameter inside the network, and for the neural network, the network parameter may be referred to as a weight.

Specifically, the server may jointly train the encoder and decoder to maintain the network parameters of the trained additional image feature extraction network unchanged, and adjust the model parameters in the encoder and decoder based on the target model loss value, so that the target model loss value is continuously decreased, thereby reducing a difference between an identity feature of the decoded face image and an identity feature of the training source face image. In this way, a difference between attribute features of the decoded face image and the training template face image is reduced, thereby improving the face swapping effect.

In this embodiment, network parameters of the additional image feature extraction network are maintained unchanged, the model parameters of the encoder and the decoder are adjusted based on the target model loss value to obtain the trained face swapping model, and image processing is performed according to the trained face swapping model, thereby improving the face swapping effect.

In some embodiments, the operation of obtaining the additional image feature extraction network includes: obtaining an additional object image, where the additional object image includes an additional object corresponding to the additional image feature; training a to-be-trained additional image recognition model by using the additional object image to obtain a trained additional image recognition model; and extracting a feature extraction layer before an image recognition layer from the trained additional image recognition model as the additional image feature extraction network.

The additional object image refers to an image including an additional object, for example, an image including glasses. The additional image recognition model may include a feature extraction layer and an image recognition layer. The image recognition layer is used for performing recognition on the additional object image according to features extracted by the feature extraction layer, for example, used for recognizing a type of the additional object in the additional object image.

Specifically, the server may obtain the to-be-trained additional image recognition model, and train the to-be-trained additional image recognition model by using a video clip including the additional object to obtain the trained additional image recognition model. The type of the additional object that may be recognized by the additional image recognition model may be the type of the additional object corresponding to the video clip during training. For example, the server may perform detection of a specific additional object on a plurality of collected video clips. When it is detected that the specific additional object is included in the video clip, the video clip is marked to obtain one or more video clips with marking information. More refers to at least two, and the same additional object may correspond to a plurality of categories. For example, glasses may correspond to a plurality of types of glasses, such as sunglasses and myopia glasses. The marking information may be category information corresponding to the specific additional object, which is used for marking a category corresponding to the specific additional object. The category of the specific additional object corresponding to different video clips may be the same or different, and the to-betrained additional image recognition model is trained by using the marked video clip to obtain the trained additional image recognition model. The additional image recognition model may be a two-class network or a multi-class network, and multiple refers to at least three. The specific additional object may be any type of additional object. The object in the collected video clip may be the same, for example, the video clip may be obtained by collecting videos of the same character. For example, when the specific additional object is glasses, the server may obtain a plurality of video clips including glasses, and mark the video clip according to the type of glasses in the video clip to obtain the video clip with marked information. The marked information is, for example, video_1, video_2, video_3, . . . , video_n. Different marked information corresponds to different glasses categories, and the glasses recognition model is trained by using the video clip with the marked information to obtain the trained glasses recognition model. The feature extraction layer is extracted from the glasses recognition model to obtain the glasses feature extraction network.

In some embodiments, when training the to-be-trained additional image recognition model, the server may further obtain a video clip that does not include the specific additional object as a negative sample, and use the negative sample and a positive sample to train the additional image recognition model. The positive sample refers to a video clip that includes the specific additional object to obtain the trained additional image recognition model. For example, the glasses feature extraction network is trained by using a video frequency band not including glasses and a video clip including glasses to obtain a trained glasses feature extraction network.

In this embodiment, a feature extraction layer is extracted before an image recognition layer from the trained additional image recognition model as the additional image feature extraction network. In this way, a network that may accurately extract the additional image feature may be obtained, which improves the accuracy of feature extraction.

In some embodiments, the server may input the decoded face image into a discriminator. The discriminator is used for discriminating whether the decoded face image is a real image to obtain a decoded discriminant result of the discriminator. The decoded discriminant result may include a decoded discriminant probability, and the decoded discriminant probability refers to a probability that the decoded face image belongs to a real image. The generation loss value is obtained based on the decoded discriminant probability, the target model loss value may further be positively correlated to the generation loss value, and the generation loss value is negatively correlated to the decoded discriminant probability. For example, the generation loss value may be expressed as the formula (10), where D(result) represents the decoded discriminant probability, and G_loss represents a biological resistance loss value.

$$G\_loss = \log(1 - D(result)) \quad (10)$$

In some embodiments, the target model loss value may be expressed as the formula (11), where id_loss represents the identity loss value, and glass_loss represents the additional feature loss value (that is, glasses loss value). Reconstruction_loss includes the enhanced non-additional image loss value and the enhanced additional image loss value, and LPIPS_loss includes the enhanced non-additional image loss value and the enhanced additional image loss value. G_loss represents the generation loss value.

$$loss = id\_loss + glass\_loss + Reconstruction\_loss + LPIPS\_loss + G\_loss \quad (11)$$

In some embodiments, the server may input the standard face image into the discriminator to obtain a standard discriminant result. The standard discriminant result may include a standard discriminant probability. The standard discriminant probability refers to a probability that the standard face image belongs to the real image. The discriminant loss value is obtained based on the standard discriminant probability and the decoded discriminant probability. The discriminant loss value is negatively correlated to the standard discriminant probability, and the discriminant loss value is positively correlated to the decoded discriminant probability. The server may adjust model parameters of the discriminator based on the discriminant loss value to obtain a trained discriminator, so that the discriminator may correctly discriminate whether the image is a real image. The generation loss value and the discriminant loss value may obtain a generation adversarial loss value, that is, the generation adversarial loss value may include the generation loss value and the discriminant loss value.

In some embodiments, the discriminator may be a multi-scale discriminator, and the server may perform scale transformation on the decoded face image to obtain decoded face images of a plurality of scales, for example, to obtain a decoded face image of a first scale, a decoded face image of a second scale, and a decoded face image of a third scale, where the first scale, the second scale, and the third scale may be set as required. For example, the first scale may be an original scale of the decoded face image, the second scale may be ½ of the first scale, and the third scale may be ½ of the second scale. Similarly, a standard face image of the first scale, a standard face image of the second scale, and a standard face image of the third scale may be obtained. The server may input the decoded face image of each scale into the multi-scale discriminator to obtain the decoded discriminant probability corresponding to the decoded face image of each scale, and similarly may obtain the standard discriminant probability corresponding to the standard face image of each scale. Each decoded discriminant probability and each standard discriminant probability obtain a discriminant loss value. For example, the discriminant loss value may be expressed as the equation (11), where D(gt_img), D(gt_img_½), and D (gt_img_¼) respectively represent a discriminant probability obtained by inputting a standard face image of an original size, a standard face image of ½ original size, and a standard face image of ¼ original size into the multi-scale discriminator. D (result), D (result_½), and D (result_¼) respectively represent a discriminant probability obtained by inputting a decoded face image of an original size, a decoded face image of ½ original size, and a decoded face image of ¼ original size into the discriminator. An original size of the standard face image and an original size of the decoded face image may be the same.

$$D\_loss = \tfrac{1}{3} * (-\log D(gt\_img) - \log(1 - D(result)) - \log D(gt\_img\_\tfrac{1}{2}) - \log(1 - D(result\_\tfrac{1}{2})) - \log D(gt\_img\_\tfrac{1}{4}) - \log(1 - D(result\_\tfrac{1}{4}))) \quad (12)$$

Figure 3:
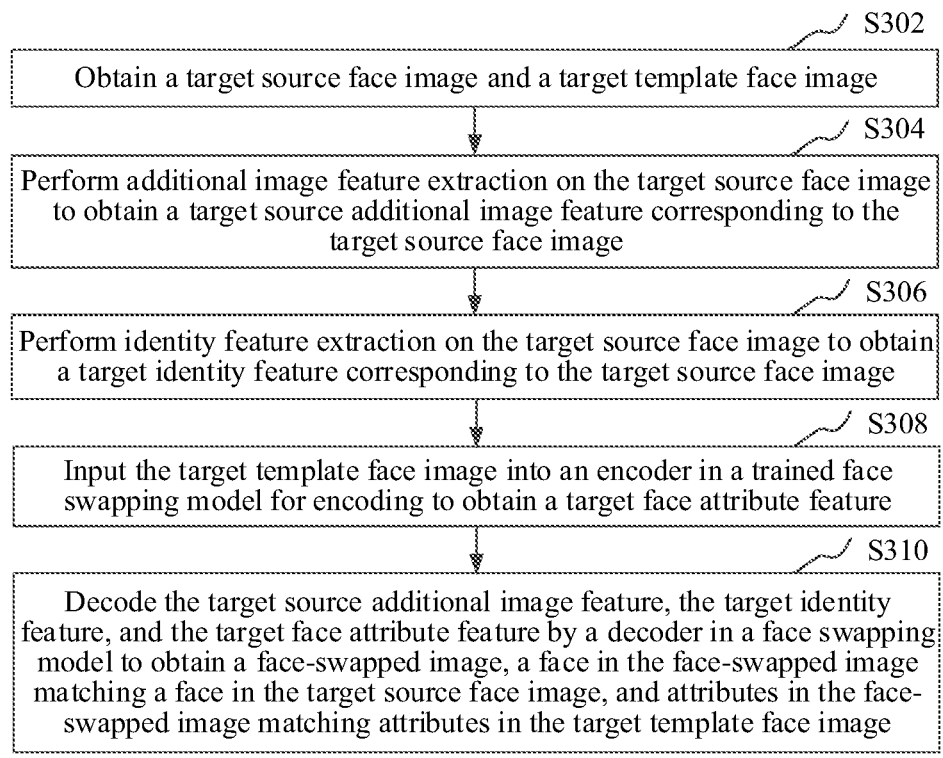
FIG. 3 is a schematic flowchart of an image processing method according to some embodiments.

In some embodiments, as shown in FIG. 3, an image processing method is provided, and a description is made by using an example in which the method is applied to the server 104 in FIG. 1, including the following operations:

S302. Obtain a target source face image and a target template face image. S304. Perform additional image feature extraction on the target source face image to obtain a target source additional image feature corresponding to the target source face image. S306. Perform identity feature extraction on the target source face image to obtain a target identity feature corresponding to the target source face image. S308.

Input the target template face image into an encoder in a trained face swapping model for encoding to obtain a target face attribute feature. S310. Decode the target source additional image feature, the target identity feature, and the target face attribute feature by a decoder in a face swapping model to obtain a face-swapped image, a face in the face-swapped image matching a face in the target source face image, and attributes in the face-swapped image matching attributes of the target template face image.

The target source face image and the target template face image are face images of different objects, such as face images of different characters. The target source additional image feature is a feature obtained by performing additional image feature extraction on the target source face image, and the target identity feature is a feature obtained by performing identity feature extraction on the target source face image. The target face attribute feature is an attribute feature obtained by encoding the target template face image by using the encoder. The identity of the face-swapped image is consistent with the identity in the target source face image. A face in the face-swapped image matches the face in the target source face image, which refers to that the identity of the face-swapped image is consistent with the identity in the target source face image. The face-swapped image is consistent with the target source face image in the additional image.

Specifically, the server may decode the target source additional image feature, the target identity feature, and target face attribute feature in the decoder in the face swapping model, so that the face in the target source face image is swapped with the target template face image to obtain the face-swapped image, and the face-swapped image is consistent with the target source face image in identity and the additional image, and is consistent with the target template face image in attributes.

Figure 4:
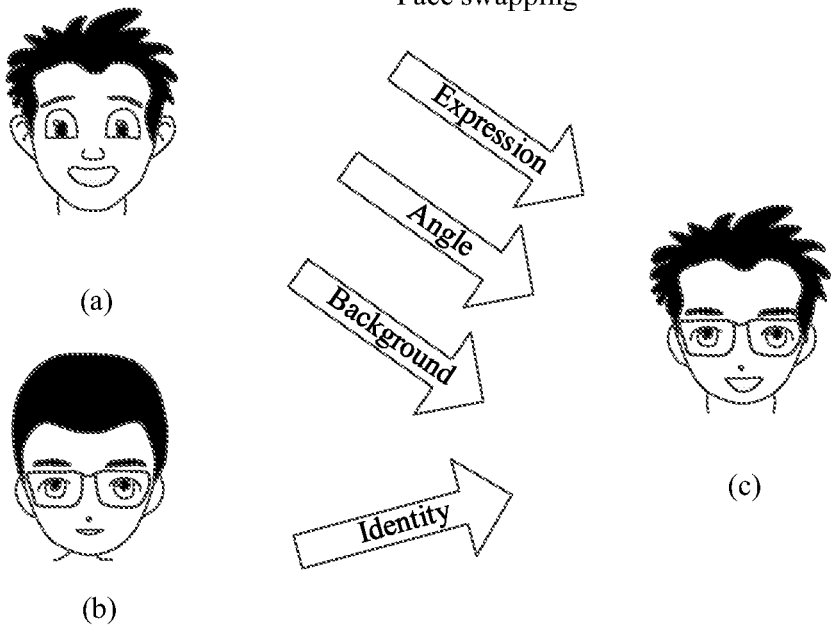
FIG. 4 is an effect diagram of face swapping according to some embodiments.

As shown in FIG. 4, the target source face image may be, for example, the face image (a) in FIG. 4, the target template face image may be, for example, the face image (b) in FIG. 4, and the face-swapped image may be, for example, the face image in FIG. 4 (c). The face image (c) is obtained by swapping the face in the face image (a) with the face in the face image (b). It may be seen from the face image (c) that an identity of the face image (c), an identity of the face image (b), and the additional image are consistent. That is, the face image (c) and the face image (b) are faces of the same person, and the face image (c) includes the same glasses as the face image (b) does. Attributes of the face image (c) are consistent with attributes of the face image (a). For example, it may be seen from the face image (c) that a hairstyle of the face image (c) is consistent with a hairstyle of face image (a), and a mouth opening angle of the face image (c) is larger than that a mouth opening angle of the face image (b), thereby conforming to a mouth opening angle of the face image (a).

In the image processing method, a target source face image and a target template face image are obtained, additional image feature extraction is performed on the target source face image to obtain the target source additional image feature corresponding to the target source face image, identity feature extraction is performed on the target source face image to obtain the target identity feature corresponding to the target source face image, the target template face image is inputted into the encoder in the trained face swapping model for encoding to obtain the target source face attribute feature, and the target source additional image feature, the target identity feature, and the target face attribute feature are decoded in a decoder in the face swapping model to obtain a face-swapped image. Because a face in the face-swapped image matches to a face in the target source face image, and attributes in the face-swapped image match attributes in the target template face image, the consistency of the identity and the additional image between the face-swapped image and the target source face image is improved, and the consistency of the attribute information of the face-swapped image and the consistency of the target template face image are ensured, thereby improving the face swapping effect.

In some embodiments, the obtaining the target source face image and the target template face image includes: obtaining a target object image corresponding to a target object of a to-be-swapped face; determining a current video frame in a target video, and comparing a face of a current object in the current video frame with a face of the target object in the target object image; and in a case that the face of the current object matches the face of the target object, obtaining a matching target template face image by segmenting the current video frame, and using a reference face image corresponding to a reference object of the target object as the target source face image; and the method further includes: swapping a target template face image in the current video frame with the face-swapped image to obtain an updated current video frame.

The target object refers to an object whose face is to be swapped. For example, when a face in a character A needs to be swapped, a target object may be the character A. The target object image refers to an image including a face region of the target object. A target video refers to a video that includes a target object, that is, the target video includes an object whose face needs to be swapped, and the target video may be, for example, a movie clip in which a face of an actor needs to be swapped. A current video frame may be any video frame in the target video, a face of a current object refers to a face region of the current object included in the current video frame, and the current object refers to an object included in the current video frame. A reference object of the target object refers to an object to which the face used for face swapping of the target object belongs. For example, when the face of the character A needs to be swapped with the face of the character B, then the character B is a reference object of the character A. The reference face image refers to an image including a face region of the reference object.

Specifically, the server may perform identity feature extraction on the face of the current object to obtain the identity feature of the current object, determine the identity of the current object based on the identity feature of the current object, and perform identity feature extraction on the face of the target object to obtain the identity feature of the target object, determine the identity of the target object based on the identity feature of the target object, and determine that the face of the current object matches the face of the target object when the identity of the current object is consistent with the identity of the target object.

In some embodiments, when it is determined that the face of the current object matches the face of the target object, the server may obtain the face region corresponding to the current object by segmenting the current video frame as the target template face image, and may obtain the reference face image from the image including the reference object by segmenting the face region of the reference object as the target source face image.

In some embodiments, the server may swap the target template face image in the current video frame with the face-swapped image to obtain the updated current video frame, and obtain the swapped video corresponding to the target video based on each swapped current video frame, so that the face of the target object in the target video is swapped with the face of the reference object, thereby implementing video face swapping.

In this embodiment, the face-swapped image is used for swapping the target template face image in the current video frame to obtain the updated current video frame, so that the face of the target object in the target video is swapped with the face of the reference object. The face-swapped image is consistent with the target source face image in the identity and the additional image, and is consistent with the target template face image in attributes, thereby improving the effect of video face swapping.

Some embodiments may provide an application scenario. The application scenario may be film and television production, and the image processing method is applied to the application scenario. Specifically, the image processing method in the application scenario in some embodiments is implemented as follows:

1. The image processing method provided in some embodiments may be used for training the to-be-trained face swapping model to obtain the trained face swapping model. The face swapping model includes an encoder and a decoder.

A first face image of the first character may be obtained from a captured video as a training source face image, and a second face image of a second character may be obtained as a training template face image. The second character image may be a synthetic image or an image obtained by real shooting. A third face image of the first character is obtained from the captured video as a standard face image, and attributes of the third face image and the second face image are consistent. The additional image of third face image is consistent with the additional image of the first face image, that is, the additional object possessed by the face in the third face image is consistent with the additional object possessed by the face in the first face image.

Specifically, the source additional image feature and the source identity feature of the training source face image are obtained, and the training source face image and the training template face image are inputted into the encoder in the face swapping model for encoding to obtain an encoding feature. The encoding feature may include the face attribute feature corresponding to the training template face image and the image feature of the training source face image. A feature triplet formed by the source additional image feature, the source identity feature, and the encoding feature are inputted into the decoder in the face swapping model for decoding to obtain the decoded face image, obtain the identity feature of the decoded face image, obtain the target identity feature, obtain the additional image feature of the decoded face image, and obtain the target additional image feature. The identity loss value is obtained based on the difference between the target identity feature and the source identity feature, and a first additional image loss value is obtained based on the difference between the target additional image feature and the source additional image feature. The additional image region is obtained by segmenting the standard face image, and a region matching a position of the additional image region is obtained from the decoded face image to obtain the image matching region. A second additional image loss value is obtained according to the difference in pixel values between the additional image region and the image matching region, a third additional image loss value is obtained based on the difference between the feature of the additional image region and the feature of the image matching region, enhancement processing is performed on a second additional image loss value to obtain an enhanced second additional image loss value, and enhancement processing is performed on a third additional image loss value to obtain an enhanced third additional image loss value. The decoded face image is inputted into the discriminator to obtain a decoded discriminant result to obtain the generation loss value according to the decoded discriminant result, the standard face image is inputted into the discriminator to obtain a standard discriminant result, and the discriminant loss value is obtained based on the decoded discriminant result and the standard discriminant result. The identity loss value, the first additional image loss value, the enhanced second additional image loss value, the enhanced third additional image loss value, and the generation loss value are used for adjusting the model parameters of the decoder and encoder to obtain the trained decoder and the trained encoder, and the model parameters of the discriminator adjusted by the discriminant loss value, and obtain the trained the discriminator. A trained face swapping model is obtained based on the trained decoder and the trained encoder.

Figure 5:
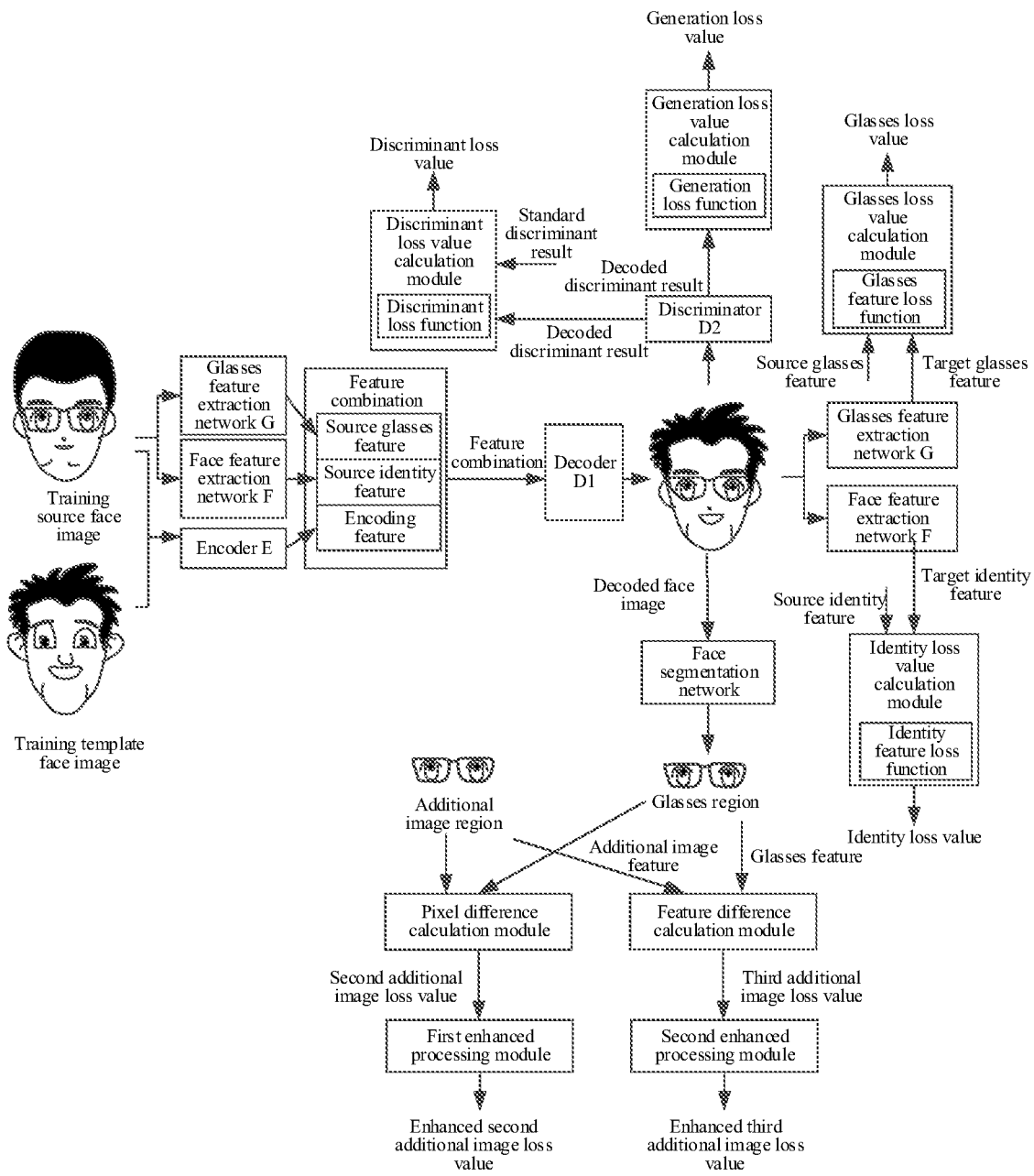
FIG. 5 is a schematic principle diagram of obtaining a decoded face image according to some embodiments.

For example, using the additional object as glasses as an example, the first additional image loss value may be, for example, the glasses loss value in FIG. 5. As shown in FIG. 5, the training source face image is inputted into a glasses feature extraction network G to obtain a source glasses feature, the training source face image is inputted into a face feature extraction network F to obtain a source identity feature, the training source face image and the training template face image are inputted into an encoder E to obtain an encoding feature, and the source glasses feature, the source identity feature, and the encoding feature are inputted into a decoder D1 to obtain a decoded face image. The decoded face image is inputted into a glasses feature extraction network G to obtain a target glasses feature, the decoded face image is inputted into a face feature extraction network F to obtain a target identity feature, the source identity feature and the target identity feature are inputted into an identity loss value calculation module, and the identity loss value calculation module performs calculation on the source identity feature and the target identity feature based on the identity feature loss function included in the identity loss value calculation module to obtain the identity loss value. The source glasses feature and the target glasses feature are inputted into the glasses loss value calculation module, and the glasses loss value calculation module may perform calculation on the target glasses feature and the source glasses feature based on the glasses feature loss function included in the glasses loss value calculation module to obtain the glasses loss value, that is, to obtain the first additional image loss value.

Figure 6:
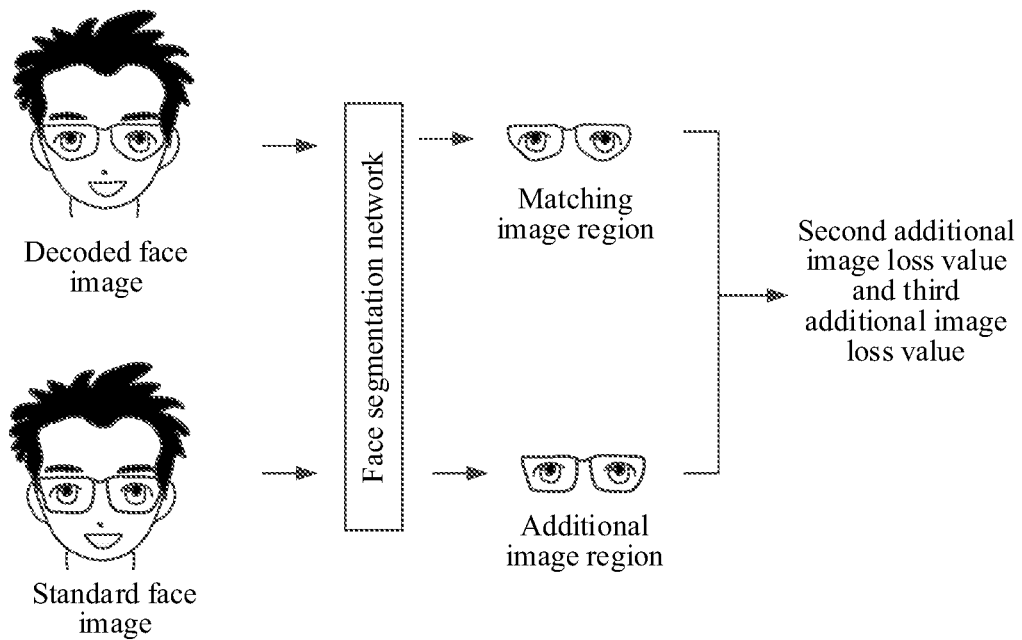
FIG. 6 is a schematic principle diagram of obtaining an additional image loss value according to some embodiments.

As shown in FIG. 6, the decoded face image is segmented by using the face segmentation network to obtain the image matching region, that is, to obtain the glasses region. The face segmentation network is used for segmenting the standard face image to obtain the additional image region, and the second additional image loss value and the third additional image loss value are obtained based on the difference between the glasses region and the additional image region. As shown in FIG. 5, the additional image region and the glasses region are inputted into the pixel difference calculation module, and the difference in pixel values between the additional image region and the glasses region is calculated by the pixel difference calculation module to obtain the second additional image loss value, and enhancement processing is performed on the second additional image loss value by a first enhanced processing module to obtain an enhanced second additional image loss value. Feature extraction is performed on the additional image region to obtain the additional image feature, and feature extraction is performed on the glasses region to obtain the glasses feature. The glasses feature and the additional image feature are inputted into the feature difference calculation module, and the difference between the glasses feature and the additional image feature is calculated through the feature difference calculation module to obtain a third image loss value, and enhancement processing is performed on the third additional image loss value by the second enhancement processing module to obtain an enhanced third additional image loss value.

Figure 7:
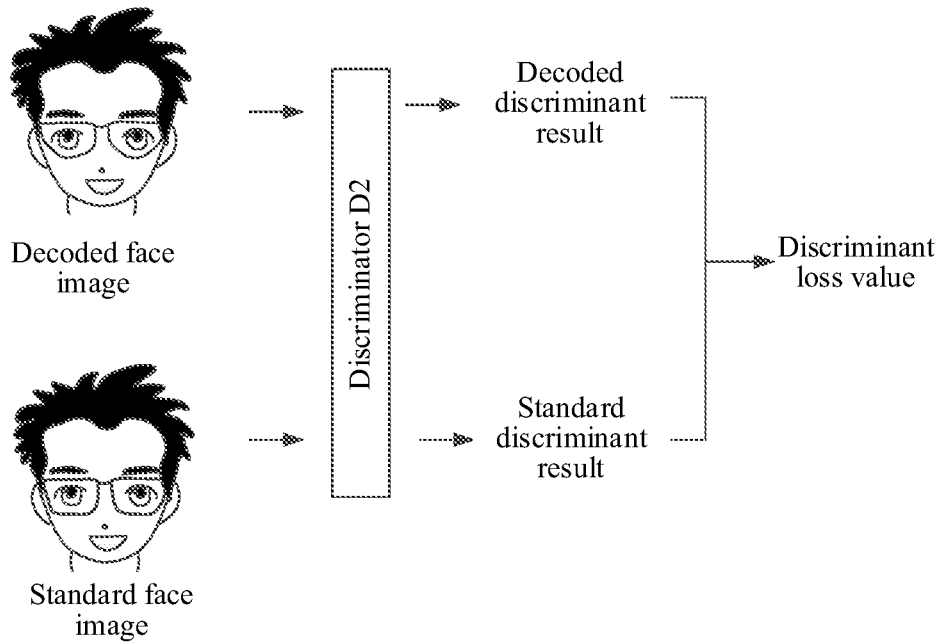
FIG. 7 is a schematic principle diagram of obtaining a discriminant loss value according to some embodiments.

As shown in FIG. 5, the decoded face image is inputted into a discriminator D2 to obtain a decoded discriminant result, and the decoded discriminant result is inputted into the generation loss value calculation module, and calculation is performed on the decoded discriminant result by the generation loss function included in the generation loss value calculation module to obtain the generation loss value. As shown in FIG. 7, the decoded face image is inputted into a discriminator D2 to obtain a decoded discriminant result, and a standard face image is inputted into the discriminator D2 to obtain a standard discriminant result. As shown in FIG. 5, the decoded discriminant result and the standard discriminant result are inputted into the discriminator loss value calculation module, and the discriminant loss value calculation module performs calculation on the discriminant loss function included in the discriminant loss function to perform calculation on the decoded discriminant result and the standard discriminant result. The decoded discriminant result may include a decoded discriminant probability, and the standard discriminant result may include a standard discriminant probability. The discriminant loss value calculation module performs calculation on the discriminant loss function included in the discriminant loss value calculation module to perform calculation on the decoded discriminant probability and the standard discriminant probability to obtain the discriminant loss value.

2. The film and television video in which the face needs to be swapped is obtained, and a video frame in which the target character whose face needs to be swapped is located is determined from the film and video as the target template face image. The reference face image corresponding to the reference character corresponding to the target character is obtained as the target source face image. The trained face swapping model may be used for swapping the face of the target character in the film and television video with the face of the reference character, so as to obtain a face-swapped film and television video.

Specifically, the target identity feature in the target source face image and the target source additional image feature may be obtained, and the target template face image and the target source face image may be inputted into the encoder of the trained face swapping model to obtain the target encoding feature. A triplet formed by the target encoding feature, the target identity feature, and the target source additional image feature are inputted into the decoder of the trained face swapping model to obtain the face-swapped image corresponding to the target template face image. The face-swapped image is consistent with the target source face image in the identity and the additional image, and the face-swapped image is consistent with the target template face image in attributes, so as to implement the swapping of the face of the target character in the film and television video.

Some embodiments provide an application scenario. The application scenario may be designed for game characters, and the image processing method is applied to the application scenario. Specifically, the image processing method in some embodiments operate as follows: a face image corresponding to a first game character may be obtained to obtain a first game face image, obtain a face image corresponding to a second game character, and obtain a second game face image. A game character refers to a character designed in the game design. The first game character is different from the second game character. By using the trained face swapping model, the face in the first game face image may be swapped with the face of the second game character, or the face in the second game face image may be swapped with the face of the first game character. For example, identity feature extraction may be performed on the first game face image to obtain the first identity feature, additional image feature extraction may be performed on a first game face image to obtain a first additional image feature, a second game face image is inputted into the encoder of the trained face swapping model for encoding to obtain a game face attribute feature, the game face attribute feature, the first identity feature, and the first additional image feature are formed into a game feature triplet, and the game feature triple is inputted into the decoder of the trained face swapping model for decoding to obtain a game face image after face swapping. The identity and the additional image in the game face image after face swapping are consistent with the identity and the additional image in the first game face image, and the attributes are consistent with the attributes of the second game face image, so that the face in the second game face image is swapped with the face of the first game character.

The trained face swapping model is applied to the game character design, so that characters of a specific style may be quickly generated, thereby improving the efficiency of the game character design, and reducing the cost of the game character design.

The image processing method provided in some embodiments may further be applied to a virtual image or a livestreaming scenario, and the image processing method in some embodiments operate as follows: a livestreaming face image of a current livestreaming character may be obtained to obtain a virtual face image of the virtual character. A face in the livestreaming face image is swapped with a face in a virtual character image by using a trained face swapping model. The virtual character refers to a non-real character, which may be drawn manually or by computer. Specifically, identity feature extraction may be performed on a virtual face image to obtain a virtual identity feature, additional image feature extraction may be performed on a virtual face image to obtain a virtual image feature, a livestreaming face image is inputted into the encoder of the trained face swapping model for encoding to obtain a livestreaming face attribute feature, the virtual identity feature, the virtual image feature, and the livestreaming face attribute feature are inputted into the decoder of the trained face swapping model for decoding to obtain a face image after face swapping. The face in the face image after face swapping is the face of the virtual character.

In the virtual image, the trained face swapping model is used for swapping the face of the real character with the face of the virtual character, so that the privacy of the user may be protected.

Although the operations in the flowcharts of the embodiments are displayed sequentially according to instructions of arrows, these operations are not necessarily performed sequentially according to a sequence instructed by the arrows. Unless clearly specified in this specification, there is no strict sequence limitation on the execution of the operations, and the operations may be performed in another sequence. Moreover, at least some of the operations in each embodiment may include a plurality of operations or a plurality of stages. The operations or stages are not necessarily performed at the same moment but may be performed at different moments. The operations or stages are not necessarily performed sequentially, but may be performed in turn or alternately with another operation or at least some of operations or stages of the another operation.

Figure 8:
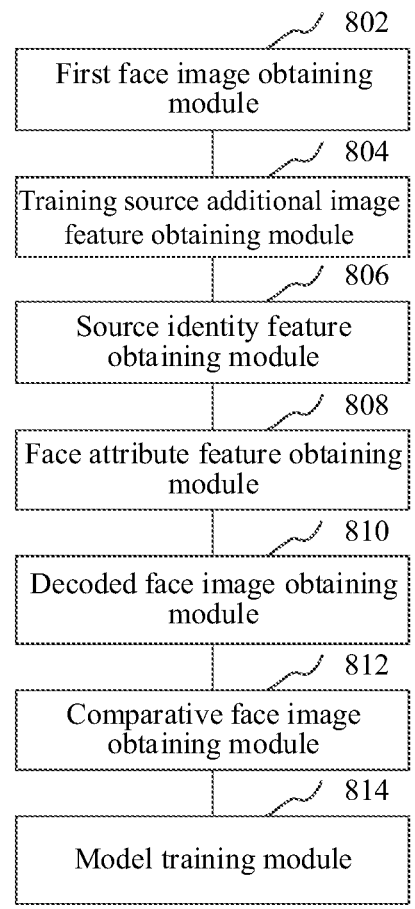
FIG. 8 is a structural block diagram of an image processing apparatus according to some embodiments.

In some embodiments, as shown in FIG. 8, an image processing apparatus is provided. The apparatus may use a software module or a hardware module, or a combination of the two to become a part of a computer device. The apparatus specifically includes: a first face image obtaining module 802, a training source additional image feature obtaining module 804, a source identity feature obtaining module 806, a face attribute feature obtaining module 808, a decoded face image obtaining module 810, a comparative face image obtaining module 812, and a model training module 814, where the first face image obtaining module 802 is configured to obtain a training source face image and a training template face image. The training source additional image feature obtaining module 804 is configured to perform additional image feature extraction on the training source face image to obtain a source additional image feature corresponding to the training source face image. The source identity feature obtaining module 806 is configured to perform identity feature extraction on the training source face image to obtain a source identity feature corresponding to the training source face image. The face attribute feature obtaining module 808 is configured to input the training template face image into an encoder in a to-be-trained face swapping model for encoding to obtain a face attribute feature. The decoded face image obtaining module 810 is configured to input the source additional image feature, the source identity feature, and the face attribute feature into a decoder in the face swapping model for decoding to obtain a decoded face image. The comparative face image obtaining module 812 is configured to obtain a comparative face image, the comparative face image including at least one of the training source face image and a standard face image corresponding to the decoded face image, and the standard face image and the training source face image being face images of a same object; and the model training module 814 is configured to obtain an additional image difference between the decoded face image and the comparative face image, and adjust model parameters of the encoder and the decoder based on the additional image difference to obtain a trained face swapping model, so as to perform image processing according to the face swapping model.

In some embodiments, the additional image difference includes a first image feature difference, and the model training module 814 includes: a target additional image feature obtaining unit, configured to perform additional image feature extraction on the decoded face image to obtain a target additional image feature corresponding to the decoded face image; a first image feature difference obtaining unit, configured to determine an image feature difference between the source additional image feature and the target additional image feature as a first image feature difference; and a first model training unit, configured to adjust the model parameters of the encoder and the decoder based on the first image feature difference to obtain the trained face swapping model.

In some embodiments, the first model training unit is further configured to obtain a target model loss value based on the first image feature difference, where the target model loss value being positively correlated to the first image feature difference; and adjusting the model parameters of the encoder and the decoder based on the target model loss value to obtain the trained face swapping model.

In some embodiments, the model training module 814 includes: an additional image region obtaining unit, configured to perform recognition on an additional image of the comparative face image to obtain an additional image region corresponding to the comparative face image. The additional image enhancement value obtaining unit is configured to obtain an additional image enhancement value corresponding to the additional image region. The additional image difference obtaining unit is configured to determine an image difference between the additional image region and an image region at a corresponding position in the decoded face image as the additional image difference. The second target model loss value obtaining the unit is configured to obtain an additional image loss value based on the additional image difference, and perform enhancement processing on the additional image loss value by using the additional image enhancement value to obtain a target model loss value; and the second model training unit is configured to adjust the model parameters of the encoder and the decoder based on the target model loss value to obtain the trained face swapping model.

In some embodiments, the additional image difference obtaining unit is further configured to obtain additional pixels in the additional image region, and obtain decoded pixels matching positions of the additional pixels from the decoded face image; calculate difference values of pixel values between the additional pixels and the decoded pixels; and calculate difference values of pixel values corresponding to the additional image region to obtain a difference calculation value, and use the difference calculation value as the additional image difference.

In some embodiments, the additional image difference obtaining unit is further configured to perform feature extraction on the additional image region to obtain an extracted additional image feature; perform feature extraction on an image region corresponding to the additional image region in the decoded face image to obtain a decoded image feature; calculate an image feature difference between the extracted additional image feature and the decoded image feature as a second image feature difference; and obtain the additional image difference based on the second image feature difference.

In some embodiments, the second target model loss value obtaining the unit is further configured to obtain the additional image loss value based on the additional image difference, and perform enhancement processing on the additional image loss value by using the additional image enhancement value to obtain an enhanced additional image loss value; obtain a non-additional image region corresponding to the comparative face image, and determine an image difference between the non-additional image region and an image region at a corresponding position in the decoded face image as a non-additional image difference; obtain a non-additional image loss value based on the non-additional image difference, where a non-additional image enhancement value corresponding to the non-additional image loss value is less than the additional image enhancement value; and obtain a target model loss value according to the enhanced additional image loss value and the non-additional image loss value.

In some embodiments, the model training module 814 includes: an additional image loss value obtaining unit, configured to obtain an additional image loss value based on an additional image difference. The target identity feature obtaining unit is configured to perform identity feature extraction on the decoded face image to obtain a target identity feature corresponding to the decoded face image. The identity loss value obtaining unit is configured to obtain an identity loss value based on an identity feature difference between the source identity feature and the target identity feature. The third target model loss value obtaining unit is configured to obtain a target model loss value according to the additional image loss value and the identity loss value. The third model training unit is configured to adjust the model parameters of the encoder and the decoder based on the target model loss value to obtain the trained face swapping model.

In some embodiments, the training source additional image feature obtaining module 804 is further configured to input the training source face image into a trained additional image feature extraction network to perform additional image feature extraction to obtain the source additional image feature corresponding to the training source face image; and the third model training unit is further configured to maintain network parameters of the additional image feature extraction network unchanged, and adjust the model parameters of the encoder and the decoder based on the target model loss value to obtain the trained face swapping model.

In some embodiments, the apparatus further includes an additional image feature extraction network obtaining module, and the additional image feature extraction network obtaining module includes: an additional object image obtaining unit, configured to obtain an additional object image, where the additional object image includes an additional object corresponding to the additional image feature. A training unit is configured to train a to-be-trained additional image recognition model by using the additional object image to obtain a trained additional image recognition model. A feature extraction layer extraction unit is configured to extract a feature extraction layer before an image recognition layer from the trained additional image recognition model as the additional image feature extraction network.

Figure 9:
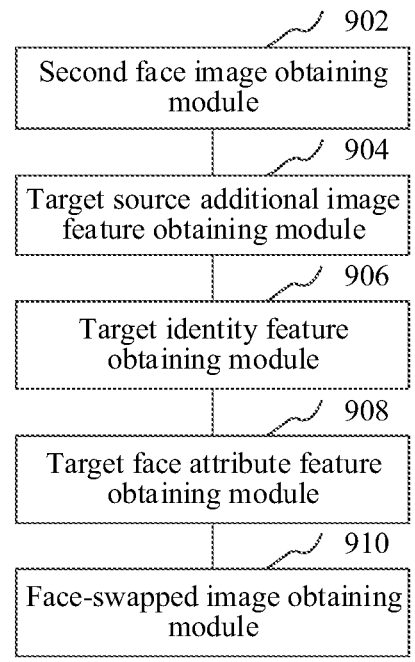
FIG. 9 is a structural block diagram of an image processing apparatus according to some embodiments.

In some embodiments, as shown in FIG. 9, an image processing apparatus is provided. The apparatus may use a software module or a hardware module, or a combination of the two to become a part of a computer device. The apparatus specifically includes: a second face image obtaining module 902, a target source additional image feature obtaining module 904, a target identity feature obtaining module 906, a target face attribute feature obtaining module 908, and a face-swapped image obtaining module 910, where the second face image obtaining module 902 is configured to obtain the target source face image and the target template face image. The target source additional image feature obtaining module 904 is configured to perform additional image feature extraction on the target source face image to obtain a target source additional image feature corresponding to the target source face image. The target identity feature obtaining module 906 is configured to perform identity feature extraction on the target source face image to obtain a target identity feature corresponding to the target source face image. The target face attribute feature obtaining module 908 is configured to input the target template face image into an encoder in a trained face swapping model for encoding to obtain a target face attribute feature. The face-swapped image obtaining module 910 is configured to decode the target source additional image feature, the target identity feature, and the target face attribute feature by a decoder in a face swapping model to obtain a face-swapped image, a face in the face-swapped image matching a face in the target source face image, and attributes in the face-swapped image matching attributes of the target template face image.

In some embodiments, the second face image obtaining module 902 includes: a target object image obtaining unit, configured to obtain a target object image corresponding to the target object of the to-be-swapped face; a face comparative unit, configured to determine a current video frame in a target video, and compare a face of a current object in the current video frame with a face of the target object in the target object image; and a target source face image obtaining unit, configured to obtain, in a case that the face of the current object matches the face of the target object, a matching target template face image by segmenting the current video frame, and use a reference face image corresponding to a reference object of the target object as the target source face image; and the apparatus is further configured to swap a target template face image in the current video frame with the face-swapped image to obtain an updated current video frame.

For a specific limit on the image processing apparatus, reference may be made to the limit on the image processing method. The modules in the foregoing image processing apparatus may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In some embodiments, a computer device is provided. The computer device may be a server, and an internal structure diagram thereof may be shown in FIG. 10. The computer device includes a processor, a memory, and a network interface connected through a system bus. The processor of the computer device is configured to provide computing and control capabilities. The memory of the computer device includes a non-volatile storage medium and an internal memory. The non-volatile storage medium stores an operating system, a computer-readable instruction, and a database. The internal memory provides an environment for running of the operating system and the computer-readable instruction in the non-volatile storage medium. The database of the computer device is configured to store related data involved in the image processing method. The network interface of the computer device is configured to communicate with an external terminal through a network connection. The computer-readable instruction is executed by the processor to implement an image processing method.

Figure 10:
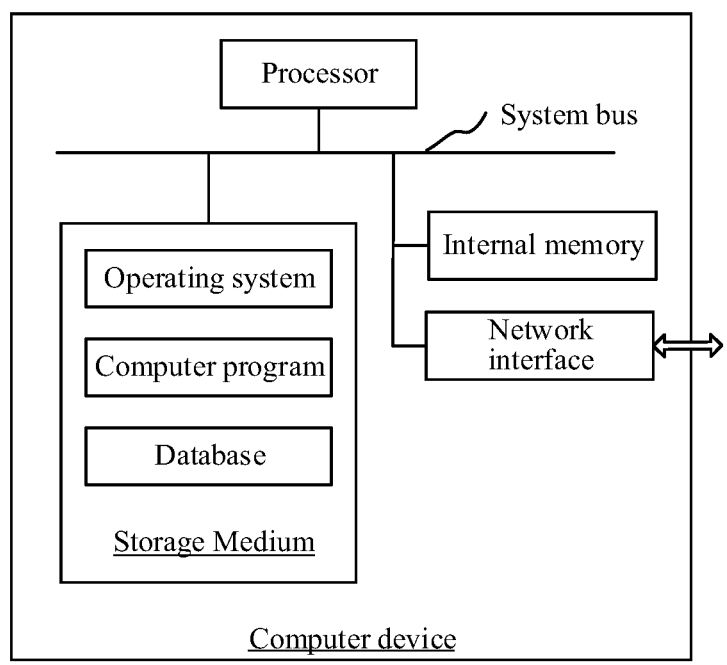
FIG. 10 is an internal structure diagram of a computer device according to some embodiments.

A person skilled in the art may understand that the structure shown in FIG. 10 is only a block diagram of a partial structure related to the solution of some embodiments, and does not limit the computer device to which the solution of some embodiments is applied. Specifically, the computer device may include more or fewer components than those shown in the figure, or some components may be combined, or a different component deployment is used.

In some embodiments, a computer device is further provided, including a memory and one or more processors, the memory storing computer-readable instructions, the computer-readable instructions, when executed by the one or more processors, causing the one or more processors to perform the operations of the foregoing method embodiments.

In some embodiments, one or more non-transitory computer-readable storage media are further provided, storing computer-readable instructions, the computer-readable instructions, when executed by one or more processors, causing the one or more processors to implement the operations in the method embodiments.

In some embodiments, a computer program product is further provided, including computer-readable instructions, the computer-readable instructions, when executed by a processor, implement the operations in the method embodiments.

A person of ordinary skill in the art may understand that some or all procedures in the method in the foregoing embodiments may be implemented by a computer-readable instruction instructing related hardware. The computer-readable instruction may be stored in a non-volatile computer-readable storage medium, and when the computer-readable instruction is executed, the procedures in the foregoing method embodiments may be implemented. Any reference to a memory, a storage, a database, or another medium used in some embodiments may include at least one of a non-volatile memory and a volatile memory. The non-volatile memory may include a read-only memory (ROM), a magnetic tape, a floppy disk, a flash memory, or an optical memory. The volatile memory may include a random access memory (RAM) or an external cache memory. As a description and not a limit, the RAM may be in a plurality of forms, such as a static random access memory (SRAM) or a dynamic random access memory (DRAM).

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments only describe several implementations of the disclosure, which are described specifically and in detail, but cannot be construed as a limitation to the patent scope of the present invention. For a person of ordinary skill in the art, several transformations and improvements can be made without departing from the idea of the disclosure. These transformations and improvements belong to the protection scope of the disclosure. Therefore, the protection scope of the patent of the disclosure shall be subject to the appended claims.

What is claimed is:

1. An image processing method, performed by a computer device, the image processing method comprising:
    obtaining a training source face image and a training template face image;
    performing additional image feature extraction on the training source face image to obtain a source additional image feature corresponding to the training source face image;
    performing identity feature extraction on the training source face image to obtain a source identity feature corresponding to the training source face image;
    inputting the training template face image into an encoder in a to-be-trained face swapping model for encoding to obtain a face attribute feature;
    inputting the source additional image feature, the source identity feature, and the face attribute feature into a decoder in the to-be-trained face swapping model for decoding to obtain a decoded face image;
    obtaining a comparative face image, the comparative face image comprising at least one of the training source face image and a standard face image corresponding to the decoded face image, and the standard face image and the training source face image being face images of a same object; and
    obtaining an additional image difference between the decoded face image and the comparative face image, and adjusting model parameters of the encoder and the decoder based on the additional image difference to obtain a trained face swapping model, so as to perform image processing according to the trained face swapping model.

2. The image processing method according to claim 1, wherein the additional image difference comprises a first image feature difference; and
    the obtaining the additional image difference comprises:
    performing the additional image feature extraction on the decoded face image to obtain a target additional image feature corresponding to the decoded face image;
    determining an image feature difference between the source additional image feature and the target additional image feature as the first image feature difference; and
    adjusting the model parameters of the encoder and the decoder based on the first image feature difference to obtain the trained face swapping model.

3. The image processing method according to claim 2, wherein the adjusting the model parameters of the encoder and the decoder comprises:
    obtaining a target model loss value based on the first image feature difference, wherein the target model loss value is positively correlated to the first image feature difference; and
    adjusting the model parameters of the encoder and the decoder based on the target model loss value to obtain the trained face swapping model.

4. The image processing method according to claim 1, wherein the obtaining the additional image difference comprises:
    performing recognition on an additional image of the comparative face image to obtain an additional image region corresponding to the comparative face image;
    obtaining an additional image enhancement value corresponding to the additional image region;
    determining an image difference between the additional image region and an image region at a corresponding position in the decoded face image as the additional image difference;
    obtaining an additional image loss value based on the additional image difference, and performing enhancement processing on the additional image loss value by using the additional image enhancement value to obtain a target model loss value; and
    adjusting the model parameters of the encoder and the decoder based on the target model loss value to obtain the trained face swapping model.

5. The image processing method according to claim 4, wherein the determining the image difference comprises:
    obtaining additional pixels in the additional image region, and obtaining decoded pixels matching positions of the additional pixels from the decoded face image;
    calculating difference values of pixel values between the additional pixels and the decoded pixels; and calculating difference values of pixel values corresponding to the additional image region to obtain a calculation difference calculation value, and using the calculation difference calculation value as the additional image difference.

6. The image processing method according to claim 4, wherein the determining the image difference comprises:
performing feature extraction on the additional image region to obtain an extracted additional image feature;
performing the feature extraction on the image region corresponding to the additional image region in the decoded face image to obtain a decoded image feature;
calculating an image feature difference between the extracted additional image feature and the decoded image feature as a second image feature difference; and
obtaining the additional image difference based on the second image feature difference.

7. The image processing method according to claim 4, wherein the obtaining the additional image loss value comprises:
obtaining the additional image loss value based on the additional image difference, and performing the enhancement processing on the additional image loss value by using the additional image enhancement value to obtain an enhanced additional image loss value;
obtaining a non-additional image region corresponding to the comparative face image, and determining the image difference between the non-additional image region and the image region at the corresponding position in the decoded face image as a non-additional image difference;
obtaining a non-additional image loss value based on the non-additional image difference, wherein a non-additional image enhancement value corresponding to the non-additional image loss value is less than the additional image enhancement value; and
obtaining the target model loss value according to the enhanced additional image loss value and the non-additional image loss value.

8. The image processing method according to claim 1, wherein the adjusting model parameters of the encoder and the decoder comprises:
obtaining an additional image loss value based on the additional image difference;
performing the identity feature extraction on the decoded face image to obtain a target identity feature corresponding to the decoded face image;
obtaining an identity loss value based on an identity feature difference between the source identity feature and the target identity feature;
obtaining a target model loss value according to the additional image loss value and the identity loss value; and
adjusting the model parameters of the encoder and the decoder based on the target model loss value to obtain the trained face swapping model.

9. The image processing method according to claim 8, wherein the performing additional image feature extraction on the training source face image comprises:
inputting the training source face image into a trained additional image feature extraction network to perform the additional image feature extraction to obtain the source additional image feature corresponding to the training source face image; and
the adjusting the model parameters of the encoder and the decoder comprises:

maintaining network parameters of the trained additional image feature extraction network unchanged, and adjusting the model parameters of the encoder and the decoder based on the target model loss value to obtain the trained face swapping model.

10. An image processing apparatus, comprising:
at least one memory configured to store program code; and
at least one processor configured to read the program code and operate as instructed by the program code, the program code comprising:
first face image obtaining code configured to cause at least one of the at least one processor to obtain a training source face image and a training template face image;
training source additional image feature obtaining code configured to cause at least one of the at least one processor to perform additional image feature extraction on the training source face image to obtain a source additional image feature corresponding to the training source face image;
source identity feature obtaining code configured to cause at least one of the at least one processor to perform identity feature extraction on the training source face image to obtain a source identity feature corresponding to the training source face image;
face attribute feature obtaining code configured to cause at least one of the at least one processor to input the training template face image into an encoder in a to-be-trained face swapping model for encoding to obtain a face attribute feature;
decoded face image obtaining code configured to cause at least one of the at least one processor to input the source additional image feature, the source identity feature, and the face attribute feature into a decoder in the to-be-trained face swapping model for decoding to obtain a decoded face image;
comparative face image obtaining code configured to cause at least one of the at least one processor to obtain a comparative face image, the comparative face image comprising at least one of the training source face image and a standard face image corresponding to the decoded face image; the standard face image and the training source face image being face images of a same object; and
model training code configured to cause at least one of the at least one processor to obtain an additional image difference between the decoded face image and the comparative face image, and adjusting model parameters of the encoder and the decoder based on the additional image difference to obtain a trained face swapping model, so as to perform image processing according to the trained face swapping model.

11. The image processing apparatus according to claim 10, wherein the additional image difference comprises a first image feature difference; and
the model training code is further configured to cause at least one of the at least one processor to:
perform the additional image feature extraction on the decoded face image to obtain a target additional image feature corresponding to the decoded face image;
determine an image feature difference between the source additional image feature and the target additional image feature as the first image feature difference; and
adjust the model parameters of the encoder and the decoder based on the first image feature difference to obtain the trained face swapping model.

12. The image processing apparatus according to claim 11, wherein the model training code is further configured to cause at least one of the at least one processor to:
obtain a target model loss value based on the first image feature difference, wherein the target model loss value is positively correlated to the first image feature difference; and
adjust the model parameters of the encoder and the decoder based on the target model loss value to obtain the trained face swapping model.

13. The image processing apparatus according to claim 10, wherein the model training code is further configured to cause at least one of the at least one processor to:
perform recognition on an additional image of the comparative face image to obtain an additional image region corresponding to the comparative face image;
obtain an additional image enhancement value corresponding to the additional image region;
determine an image difference between the additional image region and an image region at a corresponding position in the decoded face image as the additional image difference;
obtain an additional image loss value based on the additional image difference, and perform enhancement processing on the additional image loss value by using the additional image enhancement value to obtain a target model loss value; and
adjust the model parameters of the encoder and the decoder based on the target model loss value to obtain the trained face swapping model.

14. The image processing apparatus according to claim 13, wherein the model training code is further configured to cause at least one of the at least one processor to:
obtain additional pixels in the additional image region, and obtain decoded pixels matching positions of the additional pixels from the decoded face image;
calculate difference values of pixel values between the additional pixels and the decoded pixels; and
calculate difference values of pixel values corresponding to the additional image region to obtain a calculation difference calculation value, and use the calculation difference calculation value as the additional image difference.

15. The image processing apparatus according to claim 13, wherein the model training code is further configured to cause at least one of the at least one processor to:
perform feature extraction on the additional image region to obtain an extracted additional image feature;
perform feature extraction on the image region corresponding to the additional image region in the decoded face image to obtain a decoded image feature;
calculate an image feature difference between the extracted additional image feature and the decoded image feature as a second image feature difference; and
obtain the additional image difference based on the second image feature difference.

16. The image processing apparatus according to claim 13, wherein the model training code is further configured to cause at least one of the at least one processor to:
obtain the additional image loss value based on the additional image difference, and perform the enhancement processing on the additional image loss value by using the additional image enhancement value to obtain an enhanced additional image loss value;
obtain a non-additional image region corresponding to the comparative face image, and determine the image difference between the non-additional image region and the image region at the corresponding position in the decoded face image as a non-additional image difference
obtain a non-additional image loss value based on the non-additional image difference, wherein a non-additional image enhancement value corresponding to the non-additional image loss value is less than the additional image enhancement value; and
obtain the target model loss value according to the enhanced additional image loss value and the non-additional image loss value.

17. The image processing apparatus according to claim 10, wherein the model training code is further configured to cause at least one of the at least one processor to:
obtain an additional image loss value based on the additional image difference;
perform the identity feature extraction on the decoded face image to obtain a target identity feature corresponding to the decoded face image;
obtain an identity loss value based on an identity feature difference between the source identity feature and the target identity feature;
obtain a target model loss value according to the additional image loss value and the identity loss value; and
adjust the model parameters of the encoder and the decoder based on the target model loss value to obtain the trained face swapping model.

18. The image processing apparatus according to claim 17, wherein the training source additional image feature obtaining code is further configured to cause at least one of the at least one processor to:
input the training source face image into a trained additional image feature extraction network to perform the additional image feature extraction to obtain the source additional image feature corresponding to the training source face image; and
the model training code is further configured to cause at least one of the at least one processor to:
maintain network parameters of the trained additional image feature extraction network unchanged, and adjust the model parameters of the encoder and the decoder based on the target model loss value to obtain the trained face swapping model.

19. A non-transitory computer-readable storage medium, storing computer code that, when executed at least one processor, causes the at least one processor to at least:
obtain a training source face image and a training template face image;
perform additional image feature extraction on the training source face image to obtain a source additional image feature corresponding to the training source face image;
perform identity feature extraction on the training source face image to obtain a source identity feature corresponding to the training source face image;
input the training template face image into an encoder in a to-be-trained face swapping model for encoding to obtain a face attribute feature;
input the source additional image feature, the source identity feature, and the face attribute feature into a decoder in the to-be-trained face swapping model for decoding to obtain a decoded face image;
obtain a comparative face image, the comparative face image comprising at least one of the training source face image and a standard face image corresponding to the decoded face image, and the standard face image and the training source face image being face images of a same object; and obtain an additional image difference between the decoded face image and the comparative face image, and adjust model parameters of the encoder and the decoder based on the additional image difference to obtain a trained face swapping model, so as to perform image processing according to the trained face swapping model.

20. The non-transitory computer-readable storage medium according to claim 19, wherein the additional image difference comprises a first image feature difference; and the obtain the additional image difference comprises:

performing the additional image feature extraction on the decoded face image to obtain a target additional image feature corresponding to the decoded face image;

determining an image feature difference between the source additional image feature and the target additional image feature as the first image feature difference; and adjusting the model parameters of the encoder and the decoder based on the first image feature difference to obtain the trained face swapping model.

* * * * *